United States Patent
Luc et al.

(10) Patent No.: US 12,530,814 B2
(45) Date of Patent: Jan. 20, 2026

(54) RECURRENT UNIT FOR GENERATING OR PROCESSING A SEQUENCE OF IMAGES

(71) Applicant: DeepMind Technologies Limited, London (GB)

(72) Inventors: Pauline Luc, London (GB); Aidan Clark, London (GB); Sander Etienne Lea Dieleman, London (GB); Karen Simonyan, London (GB)

(73) Assignee: DeepMind Technologies Limited, London (GB)

( * ) Notice: Subject to any disclaimer, the term of this patent is extended or adjusted under 35 U.S.C. 154(b) by 488 days.

(21) Appl. No.: 17/797,198

(22) PCT Filed: Feb. 8, 2021

(86) PCT No.: PCT/EP2021/052980
§ 371 (c)(1),
(2) Date: Aug. 3, 2022

(87) PCT Pub. No.: WO2021/156511
PCT Pub. Date: Aug. 12, 2021

(65) Prior Publication Data
US 2023/0053618 A1    Feb. 23, 2023

Related U.S. Application Data

(60) Provisional application No. 62/971,639, filed on Feb. 7, 2020.

(51) Int. Cl.
*G06T 11/00* (2006.01)
*G06T 3/18* (2024.01)
(Continued)

(52) U.S. Cl.
CPC ............... *G06T 11/00* (2013.01); *G06T 3/18* (2024.01); *G06T 3/4046* (2013.01); *G06T 7/10* (2017.01);
(Continued)

(58) Field of Classification Search
CPC .......... G06T 11/00; G06T 2207/10016; G06T 2207/20221; G06T 3/4092; G06T 3/40; G06T 3/16; G06T 3/18
See application file for complete search history.

(56) References Cited

U.S. PATENT DOCUMENTS 10,176,424 B2 *   1/2019  Danihelka .............. G06N 3/044
2017/0255832 A1 *  9/2017  Jones ................... G06V 10/454
(Continued)

FOREIGN PATENT DOCUMENTS

AU        2018100318 A4    4/2018
CN        108460342 A      8/2018
(Continued)

OTHER PUBLICATIONS

Im et al., "Generating Images with Recurrent Adversarial Networks," CoRR, submitted on Dec. 13, 2016, 20 pages (Year: 2016).*

(Continued)

*Primary Examiner* — Sumati Lefkowitz
*Assistant Examiner* — Anna Lei
(74) *Attorney, Agent, or Firm* — Fish & Richardson P.C.

(57) ABSTRACT

A recurrent unit is proposed which, at each of a series of time steps receives a corresponding input vector and generates an output at the time step having at least one component for each of a two-dimensional array of pixels. The recurrent unit is configured, at each of the series of time steps except the first, to receive the output of the recurrent unit at the preceding time step, and to apply to the output of the (Continued)

recurrent unit at the preceding time step at least one convolution which depends on the input vector at the time step. The convolution further depends upon the output of the recurrent unit at the preceding time step. This convolution generates a warped dataset which has at least one component for each pixel of the array. The output of the recurrent unit at each time step is based on the warped dataset and the input vector.

19 Claims, 12 Drawing Sheets

(51) Int. Cl.
G06T 3/4046 (2024.01)
G06T 7/10 (2017.01)
G06V 10/764 (2022.01)
G06V 10/82 (2022.01)

(52) U.S. Cl.
CPC ............ G06V 10/764 (2022.01); G06V 10/82 (2022.01); G06T 2207/10016 (2013.01); G06T 2207/20081 (2013.01); G06T 2207/20084 (2013.01); G06T 2207/20221 (2013.01)

(56) References Cited

U.S. PATENT DOCUMENTS

| | | | |
|---|---|---|---|
| 2018/0288431 A1* | 10/2018 | Liu | G06V 40/171 |
| 2019/0035113 A1* | 1/2019 | Salvi | G06N 3/084 |
| 2019/0258938 A1 | 8/2019 | Mnih et al. | |
| 2019/0325306 A1* | 10/2019 | Zhu | G06N 3/045 |
| 2020/0051206 A1* | 2/2020 | Munkberg | G06T 5/73 |
| 2020/0134804 A1* | 4/2020 | Song | G06V 10/764 |
| 2021/0073997 A1* | 3/2021 | Vora | G06V 20/49 |

FOREIGN PATENT DOCUMENTS

| | | |
|---|---|---|
| CN | 109891434 A | 6/2019 |
| CN | 110390381 A | 10/2019 |
| KR | 20190125029 A | 11/2019 |
| WO | WO 2019/100065 | 5/2019 |

OTHER PUBLICATIONS

Abdolmaleki et al., "A Distributional View on Multi-Objective Policy Optimization", CORR, Submitted on May 15, 2020, 11 pages.
Afchar et al., "Mesonet: a Compact Facial Video Forgery Detection Network," CoRR, Submitted on Sep. 4, 2018, accepted to Workshop on Information Forensics and Security (WIFS), 2018, arXiv:1809.00888, 7 pages.
Amersfoort et al., "Transformation-Based Models of Video Sequences," CoRR, Submitted on Jan. 29, 2017, arXiv:1701.08435, 11 pages.
Babaeizadeh et al., "Stochastic Variational Video Prediction", CoRR, Submitted on Mar. 6, 2018, arXiv: 1710.11252v2, 15 pages.
Balaji et al., "TFGAN: Improving Conditioning for Text-to-Video Synthesis", International Conference on Learning Representations, 2018, 18 pages.
Ballas et al., "Delving Deeper Into Convolutional Networks for Learning Video Representations", Submitted on Nov. 19, 2015, arXiv:1511.06432, 11 pages.
Bi'nkowski et al., "High Fidelity Speech Synthesis with Adversarial Networks", CoRR, Submitted on Sep. 25, 2019, arXiv:1909.11646, 15 pages.
Brock et al., "Large Scale GAN Training for High Fidelity Natural Image Synthesis," CoRR, Submitted on Sep. 28, 2018, arXiv:1809.11096, 29 pages.
Burda et al., "Exploration by Random Network Distillation," CoRR, Submitted on Oct. 30, 2018, arXiv:1810.12894, 17 pages.
Carreira et al., "A Short Note About Kinetics-600," CoRR, Submitted on Aug. 3, 2018, arXiv:1808.01340, 6 pages.
Carreira et al., "A Short Note on the Kinetics-700 Human Action Dataset," CoRR, Submitted on Jul. 15, 2019, arXiv:1907.06987, 6 pages.
Carreira et al., "Quo Vadis, Action Recognition? A New Model and the Kinetics Dataset", International Conference on Computer Vision, 2017, 10 pages.
Cho et al., "Learning Phrase Representations Using RNN Encoder-Decoder for Statistical Machine Translation," CoRR, Submitted on Jun. 3, 2014, arXiv:1406.1078, 14 pages.
Clark et al, "Adversarial Video Generation on Complex Datasets", ICLR 2020 Conference, Submitted on Sep. 25, 2019, 20 pages.
De Vries et al., "Modulating Early Visual Processing by Language," Advances in Neural Information Processing Systems 30 (NIPS 2017), 2017, 11 pages.
Denton et al., "Deep Generative Image Models Using a Laplacian Pyramid of Adversarial Networks," Advances in Neural Information Processing Systems 28 (NIPS 2015), 2015, 9 pages.
Denton et al., "Stochastic Video Generation with a Learned Prior," International Conference on Machine Learning, 2018, 10 pages.
Denton et al., "Unsupervised Learning of Disentangled Representations from Video," Advances in Neural Information Processing Systems 30 (NIPS 2017), 2017, 10 pages.
Dumoulin et al., "A Learned Representation for Artistic Style," International Conference on Learning Representations, 2017, 26 pages.
Ebert et al., "Self-Supervised Visual Planning with Temporal Skip Connections," CoRR, Submitted on Oct. 15, 2017, arXiv:1710.05268, 13 pages.
Finn et al., "Deep Visual Foresight for Planning Robot Motion," CoRR, Submitted on Oct. 3, 2016, arXiv:1610.00696, 8 pages.
Finn et al., "Unsupervised Learning for Physical Interaction Through Video Prediction," Advances in Neural Information Processing Systems 29 (NIPS 2016), 2016, 9 pages.
Gao et al., "Disentangling Propagation and Generation for Video Prediction," International Conference on Computer Vision, 2019, 10 pages.
Gemp et al., D3C: Reducing the Price of Anarchy in Multi-Agent Learning, Submitted on Oct. 1, 2020, arXiv:2010.00575, 30 pages.
Gentine et al., "Could Machine Learning Break the Convection Parameterization Deadlock?," Geophysical Research Letters, 2018, 45(11):5742-5751.
Goodfellow et al., "Generative Adversarial Nets," Advances in Neural Information Processing Systems 27 (NIPS 2014), 2014, 9 pages.
Hao et al., "Controllable Video Generation with Sparse Trajectories," Proceedings of the IEEE Conference on Computer Vision and Pattern Recognition (CVPR), 2018, pp. 7854-7863, 10 pages.
Heusel et al., "GANs Trained by a Two Time-Scale Update Rule Converge to a Local Nash Equilibrium," Advances in Neural Information Processing Systems 30 (NIPS 2017), 2017, 12 pages.
Hochreiter et al., "Long Short-Term Memory," Neural Computation, 1997, 9(8):1735-1780.
Huang et al., "Multimodal Unsupervised Image-to-Image Translation," CoRR, Submitetd on Apr. 12, 2018, arXiv:1804.04732, 22 pages.
Im et al., "Generating Images with Recurrent Adversarial Networks," CoRR, submitted on Dec. 13, 2016, 20 pages.
International Preliminary Report on Patentability in International Appln. No. PCT/EP2021/052980, mailed on Aug. 18, 2022, 18 pages.
International Search Report and Written Opinion in International Appln. No. PCT/EP2021/052980, mailed on May 28, 2021, 21 pages.
Ioffe et al., "Batch Normalization: Accelerating Deep Network Training by Reducing Internal Covariate Shift,", Proceedings of the 32nd International Conference on Machine Learning, 2015, 1-9.
Jaderberg et al., "Spatial Transformer Networks," Advances in Neural Information Processing Systems 28 (NIPS 2015), 2015, 9 pages.

(56) References Cited

OTHER PUBLICATIONS

Jang et al., "Video Prediction with Appearance and Motion Conditions," Proceedings of the 35th International Conference on Machine Learning, 2018, 10 pages.
Jayaraman et al., "Time-Agnostic Prediction: Predicting Predictable Video Frames," International Conference on Learning Presentations, 2019, 1-20.
Kalchbrenner et al., "Video Pixel Networks," Proceedings of the 34th International Conference on Machine Learning, 2017, 9 pages.
Karras et al., "A Style-Based Generator Architecture for Generative Adversarial Networks," Proceedings of the IEEE/CVF Conference on Computer Vision and Pattern Recognition (CVPR), 2019, 4401-4410.
Karras et al., "Progressive Growing of GANs for Improved Quality, Stability, and Variation," International Conference on Learning Representations, 2018, 1-26.
Kay et al., "The Kinetics Human Action Video Dataset," CoRR, submitted on May 19, 2017, arXiv:1705.06950, 1-22.
Kingma et al., "Adam: A Method for Stochastic Optimization," CoRR, Submitted on Jul. 20, 2015, arXiv:1412.6980, 13 pages.
Kosiorek et al., "Sequential Attend, Infer, Repeat: Generative Modelling of Moving Objects," Advances in Neural Information Processing Systems 31 (NeurIPS 2018), 2018, 11 pages.
Kumar et al., "MelGAN: Generative Adversarial Networks for Conditional Waveform Synthesis," Advances in Neural Information Processing Systems 32 (NeurIPS 2019), 12 pages.
Lee et al., "Stochastic Adversarial Video Prediction," CoRR, submitted on Apr. 4, 2018, arXiv:1804.01523, 26 pages.
Li et al., "Flow-Grounded Spatial-Temporal Video Prediction from Still Images," CoRR, Submitted on Jul. 25, 2018, arXiv:1807.09755, 18 pages.
Li et al., "Video Generation from Text," Proceedings of the 32nd AAAI Conference on Artificial Intelligence (AAAI-18), 7065-7072.
Lim et al., "Geometric GAN," CoRR, Submitted on May 8, 2017, arXiv:1705,02894, 17 pages.
Liu et al., "Future Frame Prediction for Anomaly Detection—a New Baseline," CORR, Submitted on Dec. 28, 2017, arXiv:1712.09867, 10 pages.
Liu et al., "Video Frame Synthesis Using Deep Voxel Fflow," CoRR, Submitted on Feb. 8, 2017, arXiv:1702.02463, 10 pages.
Luc et al., "DVD GAN Resubmission," Presentation Material, Dec. 6, 2019, 21 pages.
Luc et al., "Predicting Deeper Into the Future of Semantic Segmentation," Proceedings—2017 IEEE International Conference on Computer Vision, ICVV 2017, 648-657.
Luc et al., "Predicting Future Instance Segmentation by Forecasting Convolutional Features," European Conference on Computer Vision, 2018, 16 pages.
Luc et al., Transformation-based Adversarial Video Prediction on Large-Scale Data, CoRR, Submitted on Mar. 9, 2020 and revised on Nov. 17, 2021, arXiv:2003.04035, 22 pages.
Mathieu et al., "Deep Multi-Scale Video Prediction Beyond Mean Square Error," CoRR, Submitted on Feb. 26, 2016, arXiv:1511.05440, 14 pages.
Miyato et al., "cGANs with Projection Discriminator," CoRR, Submitted on Feb. 15, 2018, arXiv:1802.05637, 21 pages.
Miyato et al., "Spectral Normalization for Generative Adversarial Networks," CoRR, Submitted on Feb. 16, 2018, arXiv:1802.05957, 26 pages.
Nguyen et al., "Deep Learning for Deepfakes Creation and Detection," CoRR, Submitted on Sep. 25, 2019, arXiv:1909.11573, 16 pages.
Office Action in European Appln. No. 21704256.3, dated Feb. 7, 2024, 12 pages.
Oliu et al., "Folded Recurrent Neural Networks for Future Video Prediction," European Conference on Computer Vision, 2018, 16 pages.
Patraucean et al., "Spatio-Temporal Video Autoencoder with Differentiable Memory," CoRR, Submitted on Sep. 1, 2016, arXiv:1511.06309, 13 pages.

Perez-Pellitero et al., "Perceptual Video Super Resolution with Enhanced Temporal Consistency," CoRR, Submited on May 2, 2019, 1-10.
Ranzato at al., "Video (Language) Modeling: A Baseline for Generative Models of Natural Videos," CoRR, Submitted on Dec. 20, 2014, arXiv:1412.6604, 1-15.
Reda et al., "SDC-NET: Video Prediction Using Spatially-Displaced Convolution," European Conference on Computer Vision, 2018, 16 pages.
Rolnick et al., "Trackling Climate Change with Machine Learning," CoRR, Subumitted on Jun. 10, 2019, arXiv:1906.05433, 97 pages.
Sabir et al., "Recurrent Convolutional Strategies for Face Manipulation Detection in Videos," CVPR Workshops, 2019, 80-87.
Saito et al., "TGANv2: Efficient Training of Large Models for Video Generation with Multiple Subsampling Layers," CoRR, submitted on Nov. 22, 2018, arXiv:1811.09245, 1-12.
Saxe et al., "Exact Solutions to the Nonlinear Dynamics of Learning in Deep Linear Neural Networks," CoRR, Submitted on Jan. 24, 2014, arXiv:1312.6120, 21 pages.
Shi et al., "Convolutional LSTM Network: A Machine Learning Approach for Precipitation Nowcasting," Advances in Neural Information Processing Systems 28 (NIPS 2015), 1-9.
Shi et al., "Deep Learning for Precipitation Nowcasting: A Benchmark and a New Model," Advances in Neural Information Processing Systems 30 (NIPS 2017), 1-11.
Soomro et al., "UCF101: A Dataset of 101 Human Actions Classes From Videos in the Wild," CoRR, Submitted on Dec. 3, 2012, arXiv:1212.0402, 7 pages.
Srivastava et al., "Unsupervised Learning of Video Representations Using LSTMs," International Conference on Machine Learning, 2015, 10 pages.
Tulyakov et al., "MoCoGAN: Decomposing Motion and Content for Video Generation," Conference on Computer Vision and Pattern Recognition, 2018, 1526-1535.
Unterthiner et al., "Towards Accurate Generative Models of Video: A New Metric & Challenges," CoRR, Submitted on Dec. 3, 2018, arXiv:1812.01717, 16 pages.
Villegas et al, "Decomposing Motion and Content for Natural Video Sequence Prediction," CoRR, submitted on Jun. 25, 2017, arXiv:1706.08033, 22 pages.
Villegas et al., "Learning to Generate Long-Term Future Via Hierarchical Prediction," CoRR, Submitted on Apr. 19, 2017, arXiv:1704.05831, 20 pages.
Vondrick et al,. "Anticipating the Future by Watching Unlabeled Video," CoRR, Submitted on Apr. 29, 2015, arXiv:1504.08023, 10 pages.
Vondrick et al., "Generating the Future with Adversarial Transformers," Conference on Computer Vision and Pattern Recognition, 2017, 1021-1028.
Vondrick et al., "Generating Videos with Scene Dynamics," Advances in Neural Information Processing Systems 29 (NIPS 2016), 2016, 1-9.
Wahlstroem et al., "From Pixels to Torques: Policy Learning with Deep Dynamical Models," CoRR, Submitted on Feb. 8, 2015, arXiv:1502.02251, 10 pages.
Walker et al., "An Uncertain Future: Forecasting from Static Images Using Variational Autoencoders," CoRR, Submitted on Jun. 25, 2016, arXiv:1606.07873, 17 pages.
Walker et al., "Dense Optical Flow Prediction from a Static Image," International Conference on Computer Vision, 2015, 2443-2451.
Wang et al., "Image Quality Assessment: from Error Visibility to Structural Similarity," IEEE Transactions on Image Processing, Apr. 2004, 13(4):600-612.
Watter et al., "Embed to Control: A Locally Linear Latent Dynamics Model for Control from Raw Images," Advances in Neural Information Processing Systems 28 (NIPS 2015), 2015, 1-9.
Weissenborn et al., "Scaling Autoregressive Video Models," International Conference on Learning Representations, 2020, 1-24.
Xiong et al., "Learning to Generate Time-Lapse Videos Using Multi-Stage Dynamic Generative Adversarial Networks," Proceedings of the IEEE Conference on Computer Vision and Pattern Recognition, 2018, 2364-2373.

(56) References Cited

OTHER PUBLICATIONS

Xu et al., "Structure Preserving Video Prediction," Proceedings of the IEEE Conference on Computer Vision and Pattern Recognition, 2018, 1460-1469.
Xuan et al., "On the Generalization of GAN Image Forensics," CoRR, submitted on Feb. 27, 2019, arXiv:1902.11153, 5 pages.
Xue et al., "Visual Dynamics: Probabilistic Future Frame Synthesis via Cross Convolutional Networks," Advances in Neural Information Processing Systems 29 (NIPS 2016), 2016, 1-9.
Zhang et al., "Self-Attention Generative Adversarial Networks," Proceedings of the 36th International Conference on Machine Learning, 2019, 10 pages.
Zhang et al., "StackGAN: text to Photo-Realistic Image Synthesis with Stacked Generative Adversarial Networks," Proceedings—2017 IEEE International Conference on Computer Vision, 2017, 5907-5915.
Zhu et al., "Object-Oriented Dynamics Predictor," Advances in Neural Information Processing Systems 31 (NIPS 2018), 2018, 12 pages.
Clark et al, "Adversarial Video Generation on Complex Datasets," ICLR 2020 Conference, Submitted on Sep. 25, 2019, 21 pages.
Office Action in Chinese Appln. No. 202180013476.7, mailed on Jun. 6, 2025, 41 pages (with English translation).

\* cited by examiner

RECURRENT UNIT FOR GENERATING OR PROCESSING A SEQUENCE OF IMAGES

CROSS-REFERENCE TO RELATED APPLICATIONS

This application is a National Stage Application under 35 U.S.C. § 371 and claims the benefit of International Application No. PCT/EP2021/052980, filed Feb. 8, 2021, which claims the benefit of priority to U.S. Provisional Application No. 62/971,639, filed Feb. 7, 2020, the entirety of which is incorporated herein by reference.

BACKGROUND

This specification relates to a recurrent unit for a neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the state of the network from a preceding time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification generally describes a system implemented as computer programs on one or more computers in one or more locations which implements a recurrent unit for an adaptive system. The recurrent unit generates an output, and warps the output during a recurrent update. As described further below, the recurrent unit may be, or be part of, a layer of a recurrent neural network.

The recurrent unit can be employed as a component of a larger adaptive system, in which the output of the recurrent unit is a hidden state of the adaptive system (i.e. data which is not output by the adaptive system). In one case, the adaptive system may include a recurrent neural network. The recurrent unit may, for example, correspond to one recurrent layer of a recurrent neural network having multiple recurrent layers. Any one or more of the recurrent layers may be a recurrent unit as described here. The recurrent layers are in a sequence (stack), with data generated by each recurrent layer of the sequence, except the last layer of the sequence, being passed to be an input to the next recurrent layer of the sequence. Furthermore, the adaptive system may comprise an input unit (e.g. composed of one or more further adaptive layer(s)) which processes data input to the adaptive system before it is transmitted to the recurrent neural network, and/or an output unit (e.g. further adaptive layer(s)) which processes data generated by the recurrent neural network. For example, one or more of the recurrent units may receive and/or generate data which is in feature space. For example, the input unit may convert images in image space (e.g. images suitable for human viewing) into feature space and/or the output unit may convert the data generated from the recurrent unit from feature space into image space.

The warping is particularly but not exclusively suited to image and video processing. Thus an adaptive system using the recurrent unit may receive and/or generate sequences of images having a temporal relationship, for example to implement a generator network for generating a sequence of images that detail a temporal sequence (such as a video comprising a series of frames).

The recurrent unit is defined by a plurality of parameters which can be varied, at least during a training phase of the adaptive system. Following the training phase, the adaptive system may have a use phase in which the parameters are not varied.

The recurrent unit can be used in multiple types of adaptive system which receive and/or generate sequences of images having a temporal progression. For example, the adaptive system may be a generator network for generating sequences of images having a temporal progression (e.g. a video resembling a video of the real world captured by a video camera).

In general terms, the disclosure proposes that a recurrent unit is arranged, at each of a series of time steps (each time step is denoted t in examples of the disclosure below) to receive a corresponding input vector (denoted $x_t$ in the examples) and to generate an output at the time step (denoted $h_t$ in the examples) having at least one component (in the examples, D components) for each of a two-dimensional array of pixels (typically a square array, having respective numbers of pixels in its two dimensions denoted in the examples respectively by H and W). The recurrent unit is configured, at each of the series of time steps except the first, to receive the output (in the examples denoted $h_{t-1}$) of the recurrent unit at the preceding time step, and to apply to the output ($h_{t-1}$) of the recurrent unit at the preceding time step at least one convolution which depends on the input vector at the time step. The convolution further depends upon the output of the recurrent unit at the preceding time step. This convolution generates a warped dataset (that is, a tensor; in the examples denoted $\tilde{h}_{t-1}$) which has at least one component (more generally, D components) for each pixel of the array. The output of the recurrent unit at each time step is based on the warped dataset and the input vector.

For example, as described below, the (recurrent) output ($h_t$) of the recurrent unit at each of the series of time steps may be used to generate respective ones of an ordered sequence of images. That is, the order of the time steps is the same as the order of the sequence of images, e.g. the first time step corresponds to the first image of the sequence; the second time step of the series corresponds to the second image of the sequence, etc. In one possibility, a given output of the recurrent unit may simply be a corresponding one of the sequence of images. In another possibility, a given output of the recurrent unit may be a feature map which can be converted into one of the sequence of images.

From a conceptual point of view, the warping may be understood as representing a transformation between two successive outputs of the recurrent unit. This may be a transformation relating to only a part of the outputs of the recurrent unit.

Suppose, for example, that two successive outputs of the recurrent unit, a "first output" and a "second output", correspond to two successive images, here a "first image" and a "second image". Suppose that both these images show an object which is moving (i.e. the object is in a different respective location in each image). The convolution may, in respect of pixels of the first output relating to the object, move the corresponding values in the first output by an amount which corresponds to the motion of the object between the first and second images. That is, the convolution, for such pixels, is a transformation which is a translation. The convolution warps the first output by moving the values relating to the pixels corresponding to the object.

To put this another way, the convolution relates a first subset of the pixels (the pixels in the first output relating to the object) to a second, different subset of the pixels (the pixels in the second output relating to the object). The convolution warps the first output by moving its values for the first group of pixels to the second group of pixels. Thus, when the recurrent unit forms the part of the second output relating to the second group of pixels, it can make use of the part of the first output relating to the first group of pixels.

In this way, information about the object which is present in a certain part of the first image can be used to improve a different part of the second image to which the object has moved. The improvement may for example ensure that the object is presented with a consistent color, size, shape, etc.). This is achieved even if the object has a large displacement between the pair of images.

Conversely, in respect of pixels of the first output which do not describe the moving object (e.g. pixels of the first output describing static background in the first image), the convolution may not cause any motion. In this way, information about the background which is present in the first image can be used to improve the part of the second image showing the same background (e.g. to ensure that this part of the background is presented with a consistent color, patterning etc. in both of the images).

The recurrent unit thus allows sequences of images to be generated with improved characteristics compared to known techniques for generating sequences of images, such as with improved consistency between successive images in the sequence, even when the degree of motion of objects within successive ones of the images is very great. For example, the generated sequence of images may exhibit greater realism, e.g. be harder for a human to distinguish from a video of the real world. This is achieved at acceptable computational cost.

Furthermore, in applications of the recurrent unit which do not necessarily generate images but rather receive a sequence of images (e.g. image sequence classification tasks, as described below), information may be extracted about an object moving within the images. The convolution of the parts of a first output of the recurrent unit relating to a moving object is such as to reflect the motion of the object to its position in a second, immediately successive output of the recurrent unit. This makes information about the object from the first output of the recurrent unit available for combination with information about the object from the second output of the recurrent unit, to generate more accurate information about the object (e.g. a more accurate classification of the object). This is achieved even if the object has a large displacement between the pair of outputs of the recurrent unit.

Note that, as described in detail below, the recurrent unit may be a portion of an adaptive system which significantly transforms the warped dataset before it is used to generate an output image and/or other output data. In particular, as mentioned above, the output of the recurrent unit and the warped dataset may in some cases be in feature space, i.e. with each of their components representing a corresponding collective property of a plurality of pixels of an image received by or output by the adaptive system.

The recurrent unit may generate the at least one component of the warped dataset for each pixel by convolving the output of the recurrent unit at the preceding time step in a respective manner (i.e. the way in which the output of the recurrent unit at the preceding step is modified to generate a pixel in the warped dataset is specific to that pixel; it may be different for every pixel, and may for each pixel be chosen as a weighted sum of a set of warping possibilities). To put this another way, the convolutional kernel used in the convolution to generate each pixel of the warped data may differ for different pixels. This difference depends at least upon the input vector. This provides flexibility in generating the convolution. There are multiple ways in which this can be achieved.

A first possibility is for the recurrent unit to generate a number (which is denoted N in the examples) of kernels which is less (e.g. at least a factor of 5 less) than the number of pixels, and to generate each component of the warped dataset as a weighted sum of respective convolutions of the output of the recurrent unit at the preceding time step with the kernels. The dimensions of the kernel may be less than H×W. The kernel may include a square array of values. For example, it may be k×k, where k may be an integer less than H and W. The weights of the weighted sum may differ for each pixel, and may be referred to as a "selection map" (which may be denoted S). This may be termed a per-pixel soft selection. The N kernels and/or the weights S may be generated using a convolutional network based on the input vector ($x_t$) and/or the output of the recurrent unit at the preceding time step ($h_{t-1}$). One way of implementing this is for the recurrent unit to convolve the output of the recurrent unit at the preceding time step with each of the kernels to generate respective intermediate warped datasets, and then to generate the (final) warped dataset for each pixel of as sum of the intermediate warped datasets weighted by the values of S for that pixel. Alternatively another way of implementing this, reversing these two steps, for each pixel, using the corresponding N values of S for that pixel to form a weighted sum W of the N kernels for the pixel, and each component of the warped dataset $\tilde{h}_{t-1}$ for that pixel is formed by multiplying the corresponding component of the pixels of the output $h_{t-1}$ of the recurrent unit at the preceding time step with a k×k kernel which is the values of W for the pixel.

Alternatively, the neural network may itself directly generate a dataset W (a further tensor) which has a different kernel for each pixel (i.e. the kernels for different pixels are independent). In this case too, the component(s) of the warped dataset for each pixel may be obtained as a sum of the corresponding component of the pixels of the output $h_{t-1}$ at the preceding time step weighted by the values of the corresponding kernel for that pixel.

Note that in either of these two cases, the kernels may depend upon both the input vector for the time step and the output of the recurrent unit in the preceding time step. They may for example, be generated by a function (denoted $f$ in the examples) which may be an adaptive component, such as a convolutional neural network or a multilayer perceptron, defined by parameters which may be trained as part of a learning procedure for the adaptive system containing the recurrent unit. In one example, the function $f$ is a "shallow cnn" (that is, with a single convolutional layer, followed successively by an adaptive max pooling layer, a hidden layer and finally a classifier unit). The function may be applied to a concatenation of the input vector for the time step and the output of the recurrent unit in the preceding time step.

Once the warped dataset has been created, the recurrent unit may generate the output at the time-step in any of multiple ways, e.g. in ways analogous to Gated Recurrent Units (GRU), such as Convolutional Gated Recurrent Units, known in the art.

In one possibility, the output ($h_t$) of the recurrent unit at each time step (t) may be a sum of (i) a component-wise product of the warped dataset ($\tilde{h}_{t-1}$) with a fusion vector (in the examples denoted u) and (ii) a component-wise product of a vector varying inversely with the fusion vector (e.g. 1-$u$) and a refined vector (in the examples denoted c) generated by a non-linear unit of the recurrent unit. The non-linear unit may for example be a rectified linear unit (ReLU) (in the examples denoted p).

Each element of the fusion vector u may be generated by applying a function, such as a sigmoid function (in the examples denoted σ), to: a respective component of the component-wise product of a first weight vector (in the examples denoted $W_u$) with a concatenation of the output of the network at the preceding time step and the input vector for the time step plus a respective first offset value (in the example the set of offset values are denoted by the vector $b_u$).

Alternatively, each element of the fusion vector u may generated by applying a function, such as the sigmoid function, to: a respective component of the component-wise product of the first weight vector with a concatenation of the warped dataset and the input vector plus the respective first offset value.

Turning now to the refined vector c, each element of the refined vector may be generated by applying a non-linear function, such as a ReLU, to: a respective component of the component-wise product of a second weight vector (in the examples denoted $W_c$) with a concatenation of the output of the network at the preceding time step and the input vector at the time step plus a respective second offset value (in the examples the set of second offset values is denoted by the vector $b_c$).

Alternatively, each element of the refined vector c may be generated by applying the non-linear function to: respective components of the component-wise product of the second weight vector with a concatenation of the warped dataset and the input vector plus the respective second offset value.

Some, or more preferably all, of the first and second weight vectors, and the first and second sets of offset values are parameters of the recurrent unit which are trained during a process of training the adaptive system of which the recurrent unit is a part (or even the whole). Optionally, however one or more of the parameters may be pre-defined. For example, some or all of the offset values may be fixed, e.g. to be zero.

Experimentally, it was found that all of these variations enabled the generation of adaptive systems with superior performance to known systems.

The recurrent unit exhibits an information flow analogous to a LSTM. As in such a memory, the refined vector c may be understood as a memory cell, or content cell, and the fusion vector u may be understood as an update vector which controls the extent to which the output of the recurrent unit resembles the warped dataset (i.e. the warped version of the previous output of the recurrent unit), or the refined vector c.

Some applications of the recurrent unit are now described.

A first type of adaptive system in which the recurrent unit can be employed is a generator network to generate a sequence of images representing a temporal progression. The generator network is configured to generate each of the sequence of images based on the respective output of the recurrent unit in a respective one of the time steps.

To put this another way, the recurrent unit makes possible a method of generating a sequence of images, the method comprising:

at each time step of a series of time steps, generating a corresponding input vector comprising one or more corresponding latent values, and inputting the input vector to the generator network, and at each time step except a first time step of the series, inputting to the recurrent unit of the generator network the output of the recurrent unit at the preceding time step; and at each time step generating a corresponding one of the sequence of images from the output of the generator network.

Optionally, the generator network may be initialized using a sequence of one or more images, so that the images it generates continue that sequence of images. Alternatively or additionally, the generator network may be controlled based on a conditional vector, which may be included in the input vector as described below, to generate a sequence of images having a corresponding property (e.g. images of a person riding a bicycle).

Optionally, the input vector may include at least one value for each pixel of the array.

The generator network may be trained within a Generative Adversarial Network (GAN) further comprising a discriminator network for distinguishing between sequences of images generated by the generator network and sequences of images which are not generated by the generator network.

The generator network and discriminator network may be trained jointly. Optionally, both the generator network and discriminator network may be modified in each iteration step, though optionally instead iteration steps in which (only) the generator network is modified may be interleaved with iteration steps in which (only) the discriminator network is modified.

The training procedure may employ one or more (typically many) first sequences of images which are not generated by the generative network but received (e.g. from a database). During each iteration step of the training procedure, the generator network may generate at least one second sequence of images. The discriminator network generates at least one discriminator score for one or more of the first sequences of images and the second sequences of images; and a control system varies the weights of the discriminator network and the generator network so as to maximize the ability of the discriminator network to distinguish between the first and second sequences of images, and to maximize the ability of the generator network to generate second sequences of images for which the discriminator network fails at this task.

Optionally (as proposed by Clark et al, "Adversarial video generation on complex datasets", 2019, the disclosure of which is incorporated herein), the discriminator network may be implemented as a dual discriminator network that comprises (i) a spatial discriminator network for generating a first discriminator score discriminating based on spatial features of individual images, and (ii) a spatio-temporal discriminator network for generating a second discriminator score discriminating based on temporal features of a series of images. To provide improvements in computational efficiency, the spatial discriminator network is applied to a (first) set of one or more images that have reduced temporal resolution and optionally also spatial resolution (relative to the input images) and the spatio-temporal discriminator network is applied to a (second) set of images that have reduced spatial resolution and/or have been cropped (relative to the input images). This allows each of the discriminator networks to be applied more efficiently (e.g. over a reduced number of processing steps) in order to produce a discriminator score for use in training the generator, whilst maintaining accuracy of the discriminator network. In addition, this allows a generator network to be trained to more accurately generate sequences of images, through the use of the improved discriminator.

The first sequence of images may have been generated computationally (e.g. by another generator) or may be real images of a real-world environment (e.g. captured by a video camera). Each of the first sequences of images might be a video (e.g. a sequence of frames of optical images) or might be some other form of temporal progression (e.g. a sequence of LiDAR images). Each image may be formed from measurements taken from one or more sensors. For instance, each image might be a multi-sensory image (e.g. an image formed through a fusion of data from a number of sensors). The sensors may sense a variety of types of measurement (for instance, sound, light, vibration, etc.). Importantly, the images form a temporal progression so that there is some temporal relationship between the images.

Varying weights of the discriminator network might comprise varying weights of the spatial discriminator network based on the first discriminator score and varying weights of the spatio-temporal discriminator network based on the second discriminator score. That is, the spatial discriminator network and the spatio-temporal discriminator network might be trained independently of each other based on their corresponding discriminator scores. This might be based on corresponding loss functions for the spatial and spatio-temporal discriminator network. Each discriminator network may be trained based on an objective function that aims to adjust (optimize) the parameters of the corresponding discriminator network to more accurately classify the image(s) input into the discriminator network as either generated by the generator network or not generated by the generator network (e.g. "real" images of an environment as opposed to generated images). The generator network might be trained with an objective function that aims to cause each discriminator network to misclassify the generated sequence of images. The generator network may be configured to generate sequences of images based solely on learned distributions without relying on any predefined prior distributions for foreground, background or motion (e.g. without making use of any predefined models for optical flow).

Determining the first discriminator score for one of the first or second sequences of images might comprise: determining, for each image in the sequence, a corresponding discriminator value representing the probability that the image was generated by the generator network; and combining the discriminator values for the images in the sequence to produce the first discriminator score. That is, the first discriminator score might be a combination of individual discriminator scores for each individual image in the sequence. Determining the first discriminator score might include summing over the discriminator values across the sequence.

Each first discriminator score might be determined based on only a single corresponding image from the sequence. That is, the spatial discriminator network may consider each image in the first set independently of the other images in the first set and produce a corresponding first discriminator score for each image in the first set. This avoids the first discriminator network learning temporal features across the sequence. Applying the spatial discriminator to multiple images and summing the discriminator scores for the images provides a more accurate classification by the discriminator.

The generator network might be trained to generate a sequence of images representing a temporal progression based on set of latent values (or simply "latents") included in the input vector for the generator network. If so, the generator network, once trained, may be used to generate image sequences based on latent values selected from a latent value distribution (or "latent distribution"). Optionally, different latent values from the distribution might be used for each time step.

As noted above, the operation of the generator network may be controlled based on a conditional vector which is input to the generator network. For example, the conditional vector may indicate to the generator network that the generated sequence of images is to be selected from a portion of a distribution specified by the conditional vector. For example, if the distribution of which the generator is supposed to generate sequences causes the generator network to generate sequences that fall into one of a plurality of predefined classes, the conditional vector may comprise one or more data values indicative of a selected one of the classes (e.g. a class label indicative of one of the classes). The generator network may include at least one conditional layer which receives at least a portion of the conditional vector, and performs a function dependent on the received conditional vector (e.g. a class label). Thus, the conditional layer(s) generate an embedding of the conditional vector. In this way, the generator network may be controlled, e.g. to generate a sample of the distribution which corresponds to a controlled one of the classes. Preferably, there are a plurality of conditional layers. The (or each) conditional layer may be implemented as a BatchNorm layer having gains and/or biases which are dependent upon the conditional vector. During the training process for the generator network, the conditional vector may be selected from a distribution, and the cost function may apply an additional cost if the generator network generates a sample from that specified by the conditional vector (e.g. a sample which is in a different class of the distribution from that specified by the conditional vector).

The first sequence of images may be associated with class labels describing their respective content. The discriminator network may receive the class label. Optionally, the discriminator network may be trained such that the discriminator network learns to determine a class.

The discriminator network might be used to condition the generator network in order allow the generator network to generate a continuation of an initial sequence of one or more images (referred to in the examples as conditioning images). Specifically, a sequence of images might be generated that are a continuation of an initial sequence of images representing a temporal progression. This might comprise:

inputting the initial sequence of images into a spatial discriminator network trained according to any of the methods described herein to produce a classification for each of the initial sequence of images (i.e. into one or more of the classes);

forming an embedding of the classifications; and utilizing the embedding to condition a generator network to generate a sequence of images that are a continuation of the initial sequence of images.

The continuation of the initial sequence of images might be concatenated after the initial sequence of images to form a generated sequence which might be input into a discriminator network (such as one trained according to the methods described herein). The output of the discriminator network might be used to train the generator network.

Forming the embedding of the classifications might comprise inputting the classifications into a self-attention block to form a tensor that combines information across the classifications.

One of more of the layers of the generator network and/or discriminator network may be residual blocks in which the output of the block is a sum of the input to the block and a function applied to the input to the block. For example, as noted above, the function may be implemented by a layer of neurons which produce outputs defined by weights, with the outputs of the neurons being subject to a non-linear operation, for example carried out by a respective rectified linear unit (ReLU).

The generator network and/or discriminator network may further contain other layer(s), such as one of more batch normalization layers, e.g. conditional batch normalization layers. A batch normalization layer is a layer which transforms its input values into respective output values which have a predefined mean value (e.g. zero) and predefined variance (e.g. unit variance), by applying a gain and bias to the input values (which in the case of conditional batch normalization may depend on a data set referred to below as a conditional vector which is input to the batch normalization layer).

Iterative modification of the generator network may employ regularization. For example, it may be performed using a cost function which includes a regularization term which is based on at least one norm of weights of the generator network (e.g. a norm formed using single vector formed by some or all the weights of the generator network; or multiple norms generated from weights of respective layers of the generator network, or from weights of respective groups of one or more of the neurons). The regularization matrix may be constructed by forming an inner product of a weight matrix of weights of the generator network and a transpose of the weight matrix.

The images of each sequence may be data representing a still or moving image, wherein individual numerical values contained in the data item may represent pixel values, for example values of one or more color channels of the pixels or gray-scale values of the pixels. The first sequences of images (training images) used for training the discriminator network (and, potentially by extension, training the generator network) may be images of the real world, captured by a camera.

For example, in one implementation, a user may use the trained generator network to generate sequences of images (e.g. videos) from an image distribution (e.g. a distribution reflecting a database of training images with which the generator network was produced, e.g. reflective of real-world images). The user supplies user input, and from it the computer determines the sequence of images. Where separable self-attention is being utilized, each image is generated using a weighted combination of embeddings across each time step. Thus, images are generated which have high fidelity to the training images. As separable self-attention is used, a lower memory footprint is required.

As noted above, the generator network may generate the data item conditioned upon a conditional vector (target data) which may be included in the input vector to the generator network, representing a target for generating the data item. The target data may represent the same or a different type or modality of data to the generated sequence of images. For example, the target data may define a label or class of one of the images for generation and the generated sequence of images may then comprise an example image of that type (e.g. African elephant). Or the target data may comprise an image or an encoding of an image (or sequence of images), and the generated sequence of images may define another, similar sequence of images—for example when trained on images of faces, the target data may comprise an encoding of a person's face and the generator network may then generate a sequence of images representing a similar face with a different pose/lighting condition. In another example, the target data may show an image of a subject and include data defining a movement/change of a viewpoint, and the generator network could generate a sequence of images of the subject from the new viewpoint.

The system may also generate video autoregressively, in particular given one or more previous video frames. These previous video frames may be used to condition the generator by applying an encoding of a set of classifications of the frames as an initial state of the recurrent unit in the generator network.

In another example, the generator network may be used to generate further sequences of images for training another machine learning system. For example the generator network and discriminator network may be jointly trained on a set of videos and then the generator network may be used to generate new videos similar to those in the training data set. The set of latent values may be determined by sampling from the latent distribution of latent values. If the generator network has been trained conditioned on additional data, e.g. labels, new videos may be generated conditioned on additional data e.g. a label provided to the generator network. In this way additional labelled videos may be generated, for example to supplement a dearth of unlabeled training videos.

A second type of adaptive system which may be formed using the recurrent unit proposed above is a segmentation network for identifying within a sequence of images a portion of each image having one or more characteristics. For example, the characteristic may be that the portion of the image represents a certain person, animal or object, or a person, animal or object in a certain class (e.g. an object having a specific shape, function or color). In the segmentation network, the recurrent unit is arranged at each of series of time steps to receive an input vector comprising a corresponding one of the sequence of images. The segmentation network is configured to generate in each time step an output from the output of the recurrent unit in the corresponding time step and which comprises data identifying the portion of the corresponding image representing a person, animal or object having the one or more characteristics. Such a segmentation network may for example define a bounding box around one or objects in an image or video sequence.

A third type of adaptive system in which the recurrent unit can be employed is a classification network for generating data which classifies a sequence of images and/or individual images in the sequence. This may be based on one or more classes (e.g. pre-determined classes) each of which corresponds to a respective characteristic of an image or a sequence of images. For example, the characteristic may be that an image, or sequence of images, show at least one person. The classification network may be configured to determine that a given image or sequence of images is in a given class. For example it may determine that the image has that characteristic, or that the sequence of images has that characteristic, or that one or more of the images in the sequence of images have that characteristic. The classification may relate to the sequence as a whole (e.g. "This sequence of images shows a person playing tennis") or relate to one or more images of the sequence specifically (e.g. "This frame shows a tennis player serving the ball"). The classification may relate to identification of one or more objects in an image or video sequence and/or to identification of a pose of one or more objects in an image or video sequence. One or more of the characteristic(s) may be a motion characteristic, i.e. indicating that the images or sequence of images show a person or object having motion meeting a certain criterion, e.g. the person or object is moving above a certain speed. Thus the classification may comprise an action classification.

The recurrent unit of the classification network may be arranged to receive a respective input at each of series of time steps comprising a corresponding one of the sequence of images. The classification network is configured to generate from the outputs of the recurrent unit at each of the respective series of time steps data identifying whether the image is in one or more of the classes. As noted this data may be data relating to the sequence as a whole, and indicating that the sequence is in one of the classes (e.g. the set of outputs from the recurrent unit may be combined to identify one or more of the classes). Alternatively, each of the outputs may be used to generate data relating to a specific image of the sequence, and indicating that what is shown in that image is in one or more of the classes.

A fourth type of adaptive system in which the recurrent unit can be employed is a system for increasing the video spatial and/or temporal resolution of an input sequence of images (e.g. a video sequence composed of a plurality of frames). For example, if each frame of the input video is a pixel with an input size of h×w (where h and w are integers), which can be included in the input vector of the recurrent unit, the adaptive system may convert each frame to a size H×W where H and W are integers, one or both of which are respectively greater than h and w and both of which are respectively at least equal to h and w. H and W may be the respective dimensions of the pixel array of outputs of the recurrent unit. Thus, the adaptive system generates an output video which has increased spatial resolution compared to the input video.

Alternatively or additionally, the adaptive system may generate more than one frame of an output video for each frame of an input video. For example, if an input video consists of $N_a$ frames where $N_a$ is an integer, the adaptive system may produce an output video of $N_b$ where $N_b$ is greater than $N_a$, such as an integer multiple of $N_a$. This can conveniently be performed with the recurrent unit operating for (at least) $N_b$ time steps, generating one of the image of the output video at each time step (except perhaps one or more time steps at the start in which initialization occurs). Thus, the adaptive system generates an output video which has increased temporal resolution compared to the input video.

The input vector to the recurrent network at time step t may for example comprise the n-th frame of the input video, where n=1, ..., $N_a$ and is equal to the smallest integer which is above $tN_a/N_b$, and the (n+1)-th frame of the input video except in the case of n=$N_a$, or data derived using one or both of these frames of the input video. Alternatively, in the first time step the input vector may comprise the first frame of the input video (or embedded data obtained from it), and in each further time step the input vector may comprise the n-th frame of the input video, where n=2, ..., $N_a$ and is equal to the smallest integer which is above $tN_a/N_b+1$.

Note that the third type of type of adaptive network described above (i.e. the classification system) is one example of a system in which the output of the recurrent unit, though defined at a two-dimensional array of pixels, is not in fact intended for viewing by a human, but rather is data (an "intermediate image") which is used for a purpose other than viewing (i.e. classification). For example, the intermediate image may include a representations of each object in an environment viewed from multiple respective directions. Other types of adaptive system exist employing the recurrent unit which generate an intermediate image, rather than one for viewing by a human.

One example is an adaptive reinforcement learning system. This is a control system for controlling an agent (e.g. an electromechanical agent) interacting with an environment (e.g. a real world environment, but alternatively a simulated environment, such as a simulated environment which models a real-world environment). For example, the reinforcement learning system may be a control system which controls a real-world electromechanical agent to interact with the environment. For example, it may control the agent to move in the environment (e.g. translate from one location in the environment to another and/or alter its configuration), to manipulate objects in the environment, and/or to alter the real-world environment (e.g. the electromechanical agent may be a heating system for the environment). In a training phase (real or simulated), the control system may learn to perform a task based on rewards generated based on results of control systems the control system sends to the agent. In a user phase, the trained control system controls the real-world agent to perform the task. The present recurrent unit may be used as part of a reward-calculation system for calculating rewards, e.g. in the case that the training is performed on a real-world agent, based on images of the real-world environment captured by a video camera.

In a variation of the recurrent unit described above, the array of pixels may, instead of being two-dimensional, have a different dimensionality, such as being one-dimensional or three dimensional.

The concepts above are expressed in terms of recurrent units or networks which may be implemented in hardware or in software. In the latter case, the concepts may alternatively be expressed as a system comprising one or more computers and one or more storage devices storing instructions that when executed by the one or more computers cause the one or more computers to perform the operations of any of the methods explained above. The computer(s) and storage device(s) may be in one location or in multiple distributed locations, e.g. connected by a telecommunication system. Alternatively, the concepts may be expressed in terms of one or more computer storage media storing instructions (e.g. tangible storage media storing instructions in non-transitory form) that when executed by one or more computers cause the one or more computers to perform the operations of any of the methods.

The subject matter described in this specification can be implemented in particular embodiments so as to realize one or more of the following advantages.

The described recurrent units and methods are able to extract motion features from sequences of images more effectively than conventional recurrent units. This can allow video processing systems using the recurrent units to achieve better performance e.g. performance of tasks such as more accurate video recognition, action classification, segmentation, bounding box identification, and pose estimation. This in turn can facilitate training of a neural network system including a recurrent unit as described, and may therefore allow training with less data, and hence less memory and compute requirements. Motion features identified by the described recurrent units may also be more easily interpretable by humans. More generally the described recurrent units provide a new way to combine previously identified features e.g. from previous frames, with a prediction of new features, e.g. of the next frame, in particular by providing a recurrent unit architecture which does this in feature space.

Thus a recurrent unit as described herein may be used to predict motion-like features. From these a system including the recurrent unit may predict video (image sequences), and/or an effect on video, and/or a set of features, taking into account a change in one or more of: camera properties or motion, scene properties (e.g. illumination or layout), object properties (e.g. presence, pose, motion, characteristics), and dis-occlusion (appearance of a previously hidden object of object part).

A further aspect of the disclosure, which is combinable with the techniques described above, but which may be implemented in a system which does not employ the recurrent unit, relates to how a system implemented as computer programs in one or more computers in one or more locations can perform a method to train (that is, adjust the parameters of) an adaptive system which is a Generative Adversarial Network (GAN) comprising a generator network and a discriminator network, based on training set of data items selected from a distribution. The generator network, once trained, may be used to generate samples from the distribution based on latent values (or simply "latents") selected from a latent value distribution (or "latent distribution"). In particular, the implementations described herein produce a generator network for generating a sequence of images that detail a temporal sequence (such as a video comprising a series of frames).

In general terms, this further aspect of the disclosure proposes the use of a dual discriminator network that comprises a spatio-temporal discriminator network for discriminating based on temporal features of a series of images and a spatial discriminator network for discriminating based on spatial features of individual images. The discriminator may be trained with improvements in computational efficiency by applying the spatial discriminator network to a set of one or more images that have reduced temporal resolution and optionally also reduced spatial resolution (relative to the input images) and applying the spatio-temporal discriminator network to a set of images that are cropped and/or have reduced spatial resolution (relative to the input images). This allows each of the discriminator networks to be applied more efficiently (e.g. over a reduced number of processing steps) in order to produce a discriminator score for use in training the generator, whilst maintaining accuracy of the discriminator network. In addition, this allows a generator network to be trained to more accurately generate sequences of images, through the use of the improved discriminator.

Moreover, the use of separate temporal and spatial discriminator networks allows the use of parallel processing to improve the speed and efficiency of the discriminator network. For instance, the spatial discriminator network may be implemented in parallel to the spatio-temporal discriminator network (e.g. through a GPU). This allows the method to leverage parallel processing to speed up the processing of the discriminator network. As the temporal and spatial discriminators act on a reduced feature space and on data of reduced resolution, this results in a quicker and more efficient discriminator network.

In addition, the generator network may make use of factorized self-attention. Self-attention allows the generator to weight the relative influence of embeddings across all time steps when generating each image. In other words, a weighted combination of all embeddings is used when each image is generated. For example, there may be a three-layer attention network, with each layer applying attention across a corresponding one of height features, width features and time features. By applying factorization to separate out the attention steps relating to these three feature spaces, the amount of memory storage required to implement self-attention is greatly reduced. This method can drastically reduce the memory footprint (e.g. 3000 fold). Experiments have shown this process to reduce the memory footprint from 150 GB to 50 MB (a reduction of 99.97%), thereby allowing the process to be performed in using conventional accelerators.

Specifically, the second aspect of the disclosure relates to training a discriminator network for use in training a generator to generate a sequence of images representing a temporal progression. The discriminator network is for distinguishing between sequences of images generated by the generator network and sequences of images which are not generated by the generator network. The discriminator network comprises a spatio-temporal discriminator network for discriminating based on temporal features and a spatial discriminator network for discriminating based on spatial features. The spatio-temporal discriminator network and the spatial discriminator network each comprise a multi-layer network of neurons in which each layer performs a function defined by corresponding weights. The training comprises:

receiving an input sequence of images representing a temporal progression;

forming, from the input sequence, a first set of images having a lower temporal resolution than the input sequence, and inputting the first set into the spatial discriminator network to determine, based on the spatial features of each image in the first set, a first discriminator score representing a probability that the input sequence has been generated by the generator network;

forming, from the input sequence, a second set of images, and inputting the second set into the spatio-temporal discriminator network to determine, based on the temporal features of the images in the second set, a second discriminator score representing a probability that the input sequence has been generated by the generator network; and varying weights of the discriminator network based on the first discriminator score and the second discriminator score;

wherein the first set of images are reduced spatial resolution versions of corresponding images from the input sequence of images and/or the second set of images are a cropped version of images in the input sequence.

The input sequence of images may have been generated by the generator or may be provided by another source (e.g. they might be real images of a real environment). The input sequence of images might be a video (e.g. a sequence of frames of optical images) or might be some other form of temporal progression (e.g. a sequence of LiDAR images). Each image may be formed from measurements taken from one or more sensors. For instance, each image might be a multi-sensory image (e.g. an image formed through a fusion of data from a number of sensors). The sensors may sense a variety of types of measurement (for instance, sound, light, vibration, etc.). Importantly, the images form a temporal progression so that there is some temporal relationship between the images.

Forming the first set might comprise selecting a subset comprising one or more images from the input sequence of images, such that the first set has fewer images than the input sequence. That is, a sample of k images might be chosen from the input sequence of images, where k is less than the total number of images in the input set, L. Each image in the first set may have lower spatial resolution than the images in the input sequence. That is, the selection of the first set might not involve altering spatial resolution of the individual images. For instance, for an input sequence of L images, each having a H×W pixels, the first set is formed to be a sequence of k images, each having H×W pixels, where k<L. In other words, the first set has a lower temporal resolution than the input sequence. The subset may be selected at random from the input sequence of images.

BRIEF DESCRIPTION OF THE DRAWINGS

Examples of the present disclosure will now be described for the sake of example only with reference to the following drawings, in which.

DETAILED DESCRIPTION

Figure 1:
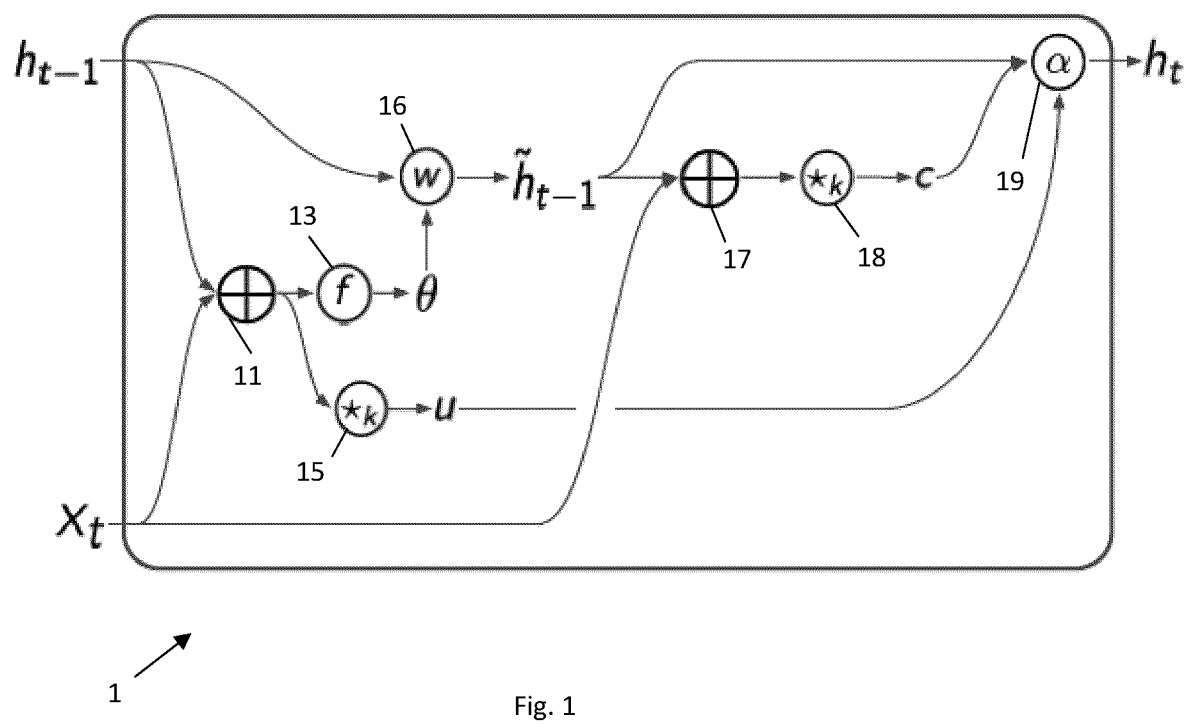
FIG. 1 shows schematically a first recurrent unit proposed by the present disclosure.

Referring firstly to FIG. 1, a recurrent unit 1 is shown according to an example of the present disclosure. The recurrent unit 1 is to be used in a process which includes a plurality of successive time steps denoted an integer variable t (for example t may be 1, . . . T where T is the total number of time steps which the recurrent unit performs). FIG. 1 explains the operation of the recurrent unit 1 at time step t.

The output of the recurrent unit at any time step t is a dataset (tensor) denoted $h_t$. The dataset $h_t$ preferably includes a number of channels D (where D is a positive integer, which may be one) for each of a two-dimensional array of points, which may be pixels. The size of the array is H×W where H and W are integers greater than one. Thus, the dimensionality of $h_t$ is H×D. For example, if D is equal to 3, the three channels may be RGB color channels of an H×W image.

In each of the time steps of the process (except the first time step of the process) the recurrent unit 1 receives the output of the recurrent unit 1 at the previous time step. This is denoted $h_{t-1}$. In the first time step of the process, the recurrent unit 1 may receive another input in place of $h_{t-1}$, such as a predetermined dataset (or a random dataset) with the same dimensionality as one of the outputs of the recurrent unit. This input may be used to condition the recurrent unit 1.

A second of the inputs to the recurrent unit 1 is a data-set x referred to an input vector. As described below, in some uses of the recurrent unit (but not all) the input vector x is different at different ones of these time steps. Without loss of generally the input vector is denoted $x_t$.

The input vector $x_t$ for each value of t also encodes multi-dimensional data. In particular, $x_t$ for any given value of t may include a number of channels D' (where D' is a positive integer, which may be one and may be equal to D) for each of a two dimensional array having dimensions H' and W'. Thus, the dimensionality of $x_t$ is H'×W'×D'. Optionally, H may be equal to H', and W may be equal to W'. More generally, the ratio H:W may be substantially the same as the ratio H'W'.

In the recurrent unit 1, the inputs $h_{t-1}$ and $x_t$ may be concatenated by a concatenation unit 11.

The output of the concatenation unit 11 is input to a shallow convolutional neural network 13 which from it generates (by a function denoted $f$) a corresponding output denoted θ.

The output θ of the neural network 13 is used to control a warping unit 16 which applies a convolution denoted warp to the input $h_{t-1}$ of the recurrent unit. The warping convolution warp is explained in more detail below with reference to FIGS. 2 and 3. Thus, the convolution is dependent on the input vector $x_t$ at the time step t and on the output $h_{t-1}$ of the recurrent unit at the preceding time step. The convolution generates a warped dataset which is denoted $\tilde{h}_{t-1}$. The warped dataset may have the same dimensionality H x W x D as the output of $h_{t-1}$ of the recurrent unit. Thus, it includes D components for each pixel of the array.

The recurrent unit further includes a second convolution unit 15 which applies to the output of the concatenation unit 11 a convolution $W_u$ with a kernel size k×k (such a convolution is denoted here *k) and an offset value $b_u$, and applies the sigmoid function σ elementwise to the result. This produces a vector referred to as the "fusion vector" u. This is another H×W×D dataset.

A third concatenation unit 17 generates a concatenation of the warped dataset $\tilde{h}_{t-1}$ and the input vector $x_t$. The result is transmitted to a second convolution unit 18 which applies a further convolution $W_c$ with a kernel size k and an offset $b_c$, and applies a non-linear activation function ρ elementwise to the result to generate a so-called "refined vector" c. This is another H×W×D dataset. The function ρ may be a ReLU function.

A summation unit 19 generates $h_t$ by summing the warped dataset $\tilde{h}_{t-1}$ and the refined vector c with a respective weighting which depends upon the fusion vector u. Specifically, the summation unit 19 represents an elementwise convex combination with a coefficient provided by u.

Thus, the recurrent unit 1 performs in each time step the calculations:

$$\theta_{h,x} = f(h_{t-1}, x_t) \quad (1)$$

$$\tilde{h}_{t-1} = \text{warp}(h_{t-1}; \theta_{h,x})$$

$$c = \rho(W_{c*k}[\tilde{h}_{t-1}; x_t] + b_c)$$

$$u = \sigma(W_{u*k}[\tilde{h}_{t-1}; x_t] + b_u)$$

$$h_t = u \odot \tilde{h}_{t-1} + (1-u) \odot c$$

Here, elementwise multiplication is denoted ⊙, and the function performed by the warping unit 16 is denoted by warp.

The function performed by the recurrent unit 1 is analogous to widely-used Convolutional Gated Recurrent Units ConvGRUs, but these do not employ equivalents to the neural network 13 or the warping unit 16. We now turn to an explanation of these elements with reference to FIGS. 2 and 3, which show two respective ways of implementing them. Note that FIGS. 2 and 3 just show the operations of the convolution unit 11, neural network 13 and warping unit 16, and omit for example the path from the convolution unit 11 to the second convolution unit 15.

Figure 2:
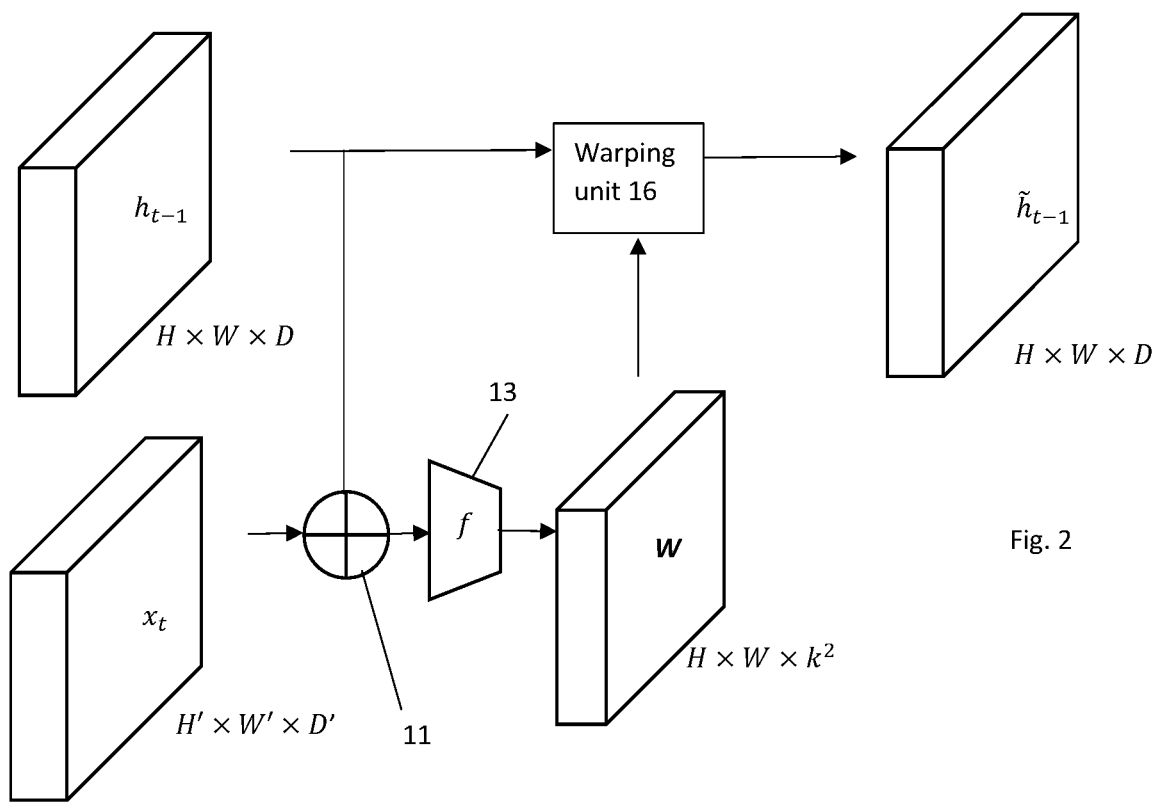
FIG. 2 illustrates a first possible implementation of a warping operation implemented by the recurrent unit of FIG. 1.

In the implementation of FIG. 2 (so-called "pixel-wise warping"), the output θ of the neural network 13 is a tensor of weights W. W has dimensionality H×W×k². The warping unit 16 uses these parameters for a depthwise convolution performed on $h_{t-1}$, using locally-connected layers of kernel size k (i.e. the D channels of each pixel of $h_{t-1}$ are convolved using a different k×k kernel for each respective pixel). Formally, at a given spatial position (i,j), the $c^{th}$ component of the warped dataset $\tilde{h}_{t-1}$ is given by:

$$\tilde{h}_{i,j}[c] = \Sigma_{(m,n) \in [0,k-1]^2} W_{i,j}[mk+n] \cdot h_{i+m-(k-1)//2, j+n-(k-1)//2}[c] \quad (2)$$

Here // denotes the quotient of Euclidean division (a//2 is equivalent to conventional division by two when the numerator a is an even number). This equation omits the time dependency t for simplicity; with it, each of $\tilde{h}$ and h would have a subscript t-1, and W too is different for each time step t. Note that for portions of the array near the edges, the array $h_{t-1}$ is padded (e.g. with zeros) so that its value for is well-defined at all positions referenced by Eqn. (2), while preserving its spatial dimensions.

Figure 3:
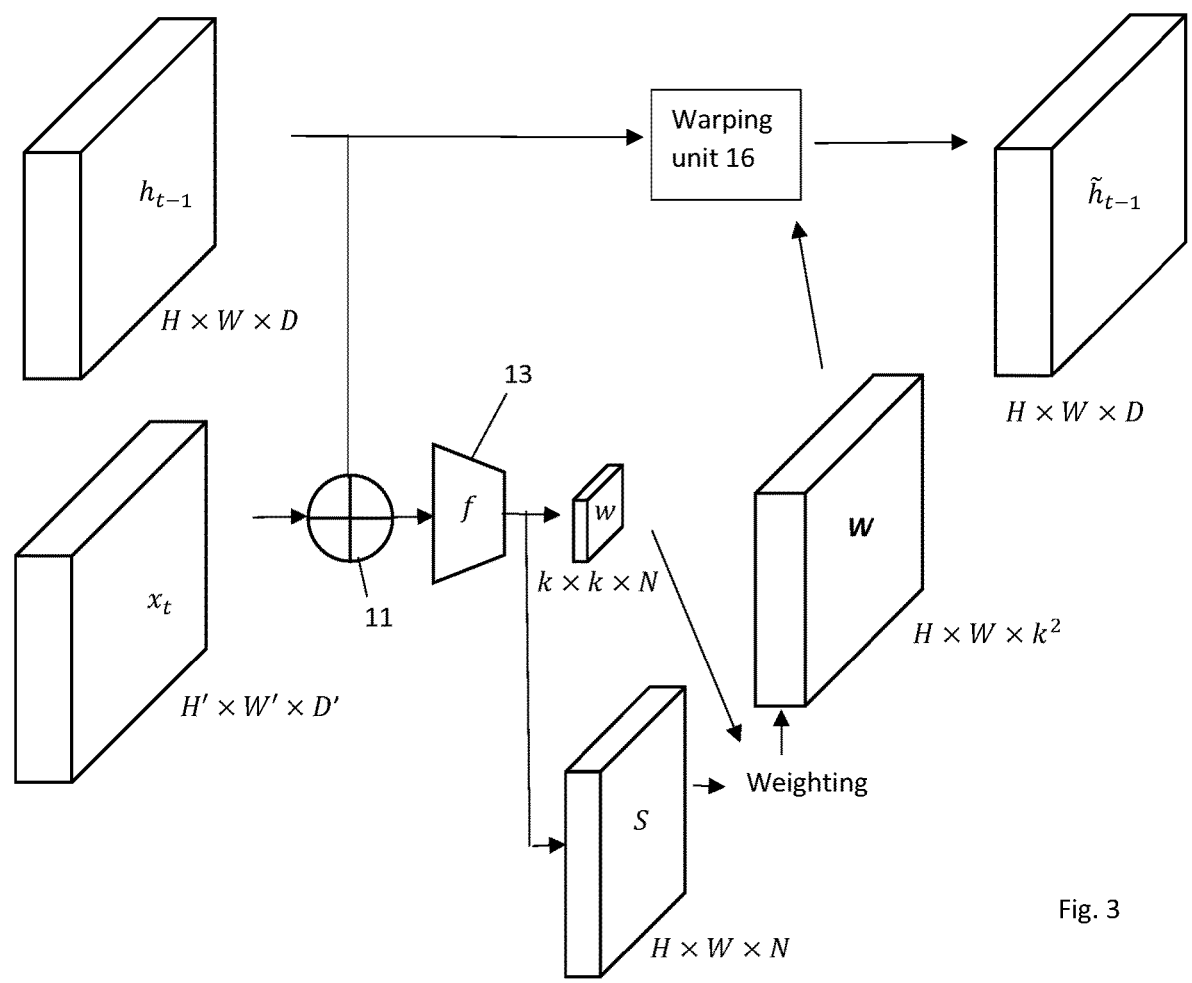
FIG. 3 illustrates a second possible implementation of a warping operation implemented by the recurrent unit of FIG. 1.

Turning to FIG. 3 (so called factorized warping), the neural network 13 in this case is configured to produce an output θ which comprises a set of weights w having dimensions k×k×N where N is an integer. Thus, the set of weights w defines N k×k kernels. The output θ further comprises a selection map S having dimensions k×k×N. The tensor of weights W in this case is produced according to the following equation for the q-th dimension of $W_{i,j}$:

$$W_{i,j}[q] = \Sigma_{l=1}^N s_{i,j}[l] \cdot w[q,l] \quad (3)$$

The tensor of weights W is then used by the warping unit in the same way as in FIG. 2, using Eqn. (3). Thus, in both the implementations of FIGS. 2 and 3, the system produces a respective kernel $W_{i,j}$ for each pixel based on using the input vector $x_t$, and generates the corresponding component $\tilde{h}_{i,j}$ of the warped dataset $\tilde{h}_{t-1}$ based on the corresponding kernel.

In the case of FIG. 3, but not FIG. 2, the warped dataset is a weighted sum of N convolutions of the output of the recurrent unit at the preceding time step respectively with N k×k kernels defined by the weight matrix w. The k×k kernels are each dependent on the input vector and the output of the recurrent unit at the preceding time step. The weights of the weighted sum for a given pixel (i,j) are given by the N values of S for (i,j), and thus are different for different corresponding pixels of the array.

In the implementation of FIG. 3, the weighted sum $W_{i,j}$ given by Eqn. (3) is first calculated, and then the warped dataset $\tilde{h}_{t-1}$ is obtained using Eqn. (2). However, equivalently, the order of these steps can be reversed. That is, the output $h_{t-1}$ of the recurrent unit 1 at the preceding time step may be convolved with each of the N k×k kernels defined by the weight matrix w, to generate N respective intermediate warped datasets, and then, for each pixel (i,j) of the array, a weighted sum of the intermediate warped datasets may be formed using the respective N values of S for (i,j). In this case too, since the weights of the weighted sum for a given pixel (i,j) are given by the N values of S for (i,j), and they are different for different pixels of the array.

Figure 4:
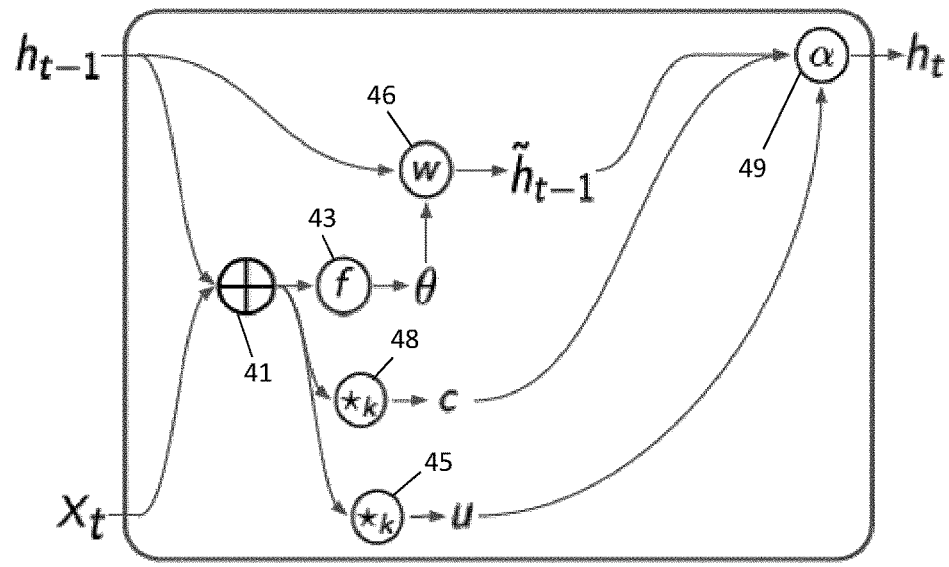
FIG. 4 shows schematically an alternative recurrent unit proposed by the present disclosure.

Turning to FIG. 4, an alternative form 4 of the recurrent unit it shown. This has the same components as the recurrent unit 1 of FIG. 1 (except for having only one convolution unit), which are labelled by respective reference numerals which are 30 higher. The operation of the recurrent unit 4 (analogously to Eqn. (1)) is:

$$\theta_{h,x} = f(h_{t-1}, x_t) \quad (4)$$

$$\tilde{h}_{t-1} = \text{warp}(h_{t-1}; \theta_{h,x})$$

$$c = \rho(W_{c*k}[\tilde{h}_{t-1}; x_t] + b_c)$$

$$u = \sigma(W_{u*k}[\tilde{h}_{t-1}; x_t] + b_u)$$

$$h_t = u \odot \tilde{h}_{t-1} + (1-u) \odot c$$

Figure 5:
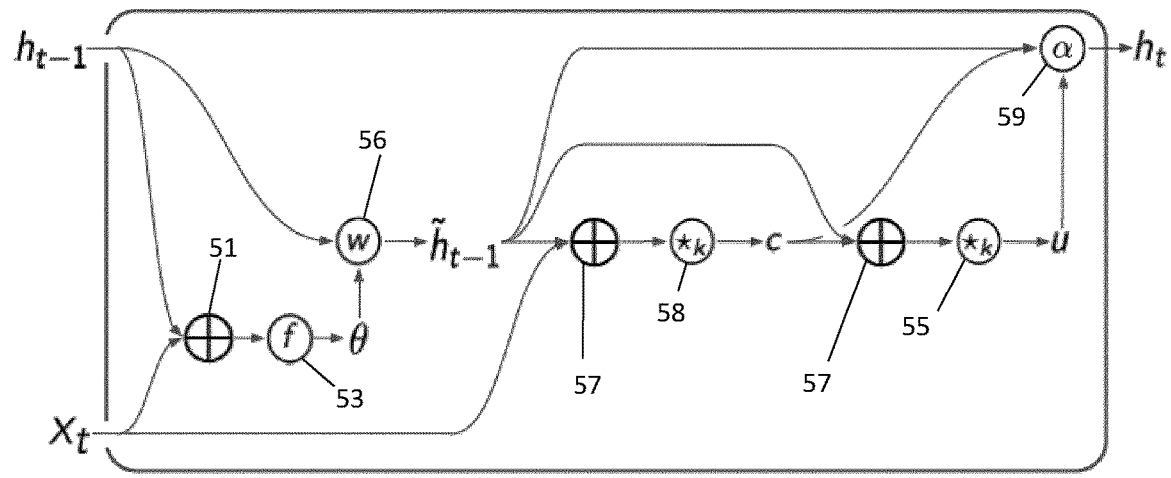
FIG. 5 shows schematically another alternative recurrent unit proposed by the present disclosure.

Turning to FIG. 5, another alternative form 5 of the recurrent unit is shown. This has the same components as the recurrent unit 1 of FIG. 1 (except for having one more convolution unit), which are labelled by respective reference numerals which are 50 higher. The operation of the recurrent unit 4 (analogously to Eqn. (1)) is:

$$\theta_{h,x} = f(h_{t-1}, x_t) \quad (5)$$

$$\tilde{h}_{t-1} = \text{warp}(h_{t-1}; \theta_{h,x})$$

$$c = \rho(W_{c*k}[\tilde{h}_{t-1}; x_t] + b_c)$$

$$u = \sigma(W_{u*k}[\tilde{h}_{t-1}; c] + b_u)$$

$$h_t = u \odot \tilde{h}_{t-1} + (1-u) \odot c$$

Note that FIGS. 4 and 5 each use the same combination of the neural network 13 and the warping unit 16 as in FIG. 1. In the cases of recurrent units 4 and 5 also, the functions of these units are as described above with reference to FIGS. 2 and 3. Thus, in the recurrent unit 4 and 5 also, a convolution is applied to the output $h_{t-1}$ of the recurrent units 4, 5 at the preceding time step which depends upon the input vector $x_t$ at the time step and on the output $h_{t-1}$ of the recurrent units 4, 5 at the preceding time step. Furthermore, once again, the convolutional kernel used in the convolution to generate each pixel of the warped data is different for each pixel, since the k×k kernel specified by W differs for different pixels.

Experimentally, the performance of the recurrent units 1, 4 and 5 of FIGS. 1, 4 and 5 was found to be similar to each other in various tests, and superior to known recurrent units.

Figure 6:
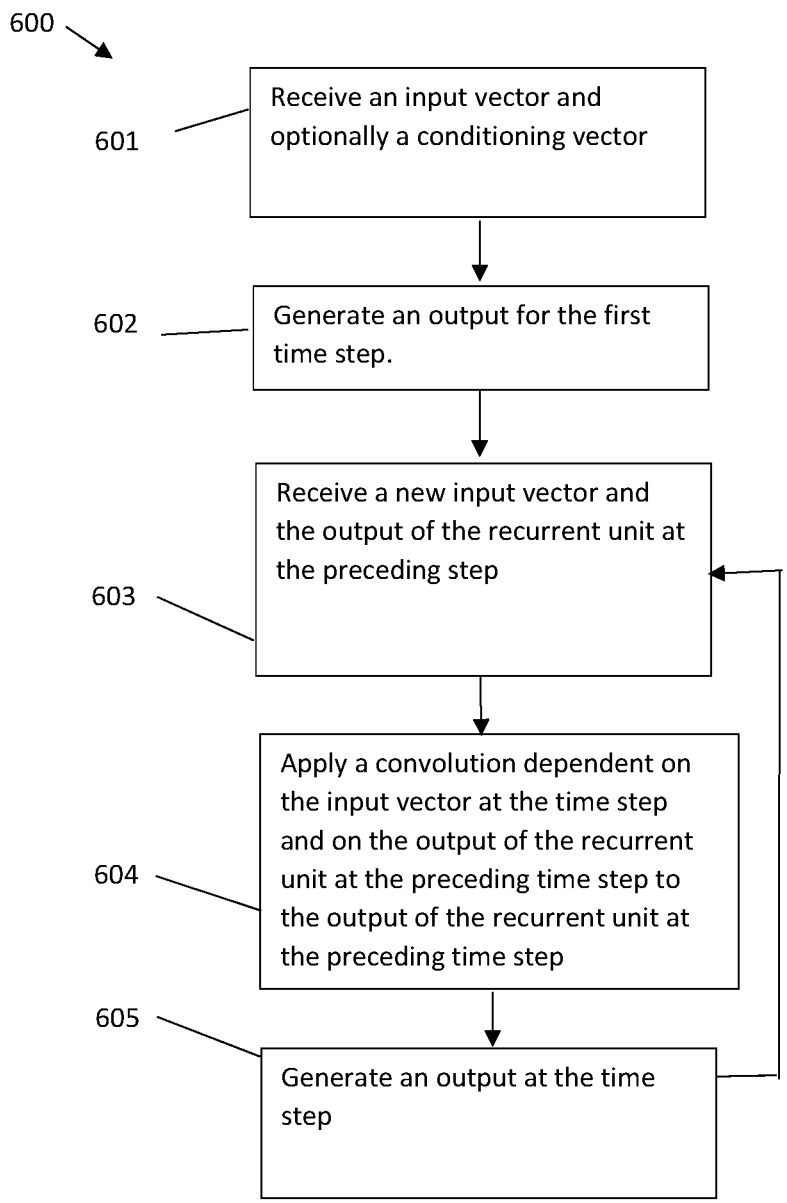
FIG. 6 shows the steps of method performed by a recurrent unit according to the present disclosure.

FIG. 6 shows schematically steps of a method 600 performed by the recurrent unit 1, 4, 5 of FIG. 1, 4 or 5. In step 601, at a first time step (e.g. t=0) the recurrent unit 1, 4, 5 receives an input vector ($x_1$). It may also receive a conditioning vector.

In step 602, the recurrent unit 1, 4. 5 generates an output $h_1$ by applying the corresponding one of the sets of equations (1), (4), (5), using the conditioning vector (if any) in place of $h_{t-1}$. In the case that no conditioning vector is received in step 601, the recurrent unit may use a predetermined dataset (e.g. with all values zero) in place of $h_{t-1}$.

Note that the set of two steps 601, 602 may optionally be repeated at least once at successive respective time steps, e.g. using the same or a different conditioning vector each time.

In step 603, which is performed at t=2 (or in the case that the set of steps 601, 602 has been repeated n times, at time 2+n, but this possibility is neglected below for simplicity), the recurrent unit 1, 4, 5 receives the output $h_1$ of the recurrent unit at the preceding time step, and a new input vector $x_2$. $x_2$ may be different from $x_1$ or the same.

In step 604, the recurrent unit 1, 4, 5 performs the first two equations of the corresponding one of the sets of equations (1), (4) and (5) to generate a warped dataset $\tilde{h}_{t-1}$.

In step 605, the recurrent unit 1, 4, 5 performs the remainder of the equations of the corresponding one of the sets of equations (1), (4) and (5), to generate an output for time step t=2 which is $h_2$. Time step t=2 is now completed.

The method 600 now returns at least once to step 603, to perform operations of the set of steps 603-605 at least once. Each performance of the set of steps corresponds to one successive additional time step.

We now turn to applications of the recurrent units 1, 4, 5 of FIG. 1, 4 or 5. A first application is part of a generator network for generating video sequences. The generator network may be trained within a Generative Adversarial Network (GAN) further comprising a discriminator network. That is, the GAN includes a generator for generating image sequences (or other sequences of multi-dimensional datasets) based on input vectors $x_t$ which may be random, and optionally conditioning vectors; and a discriminator for distinguishing between image sequences generated by the generator and a training database of image sequences (or of other sequences of multi-dimensional datasets), which may be videos of the real world captured by a video camera. The generator and/or discriminator may have the form shown in FIG. 3 of Clark et al, where the recurrent unit 1, 4, 5 is used as the convolutional gated recurrent unit of the generator.

In short, the generator has an input unit which generates an input vector. The input unit includes a source of Gaussian noise. Gaussian noise from the source (e.g. a sample from the distribution for each of an array of pixels) is processed using a convolution with a kernel size of 1×1, and the result is concatenated with a one-hot vector which serves to indicate to the Generator a class of video sequence which it is to produce. This one-hot vector is an example of a conditional vector included in the input vector. The concatenation is subject to a further convolution with a 1×1 kernel to form the input vector.

Figure 8:
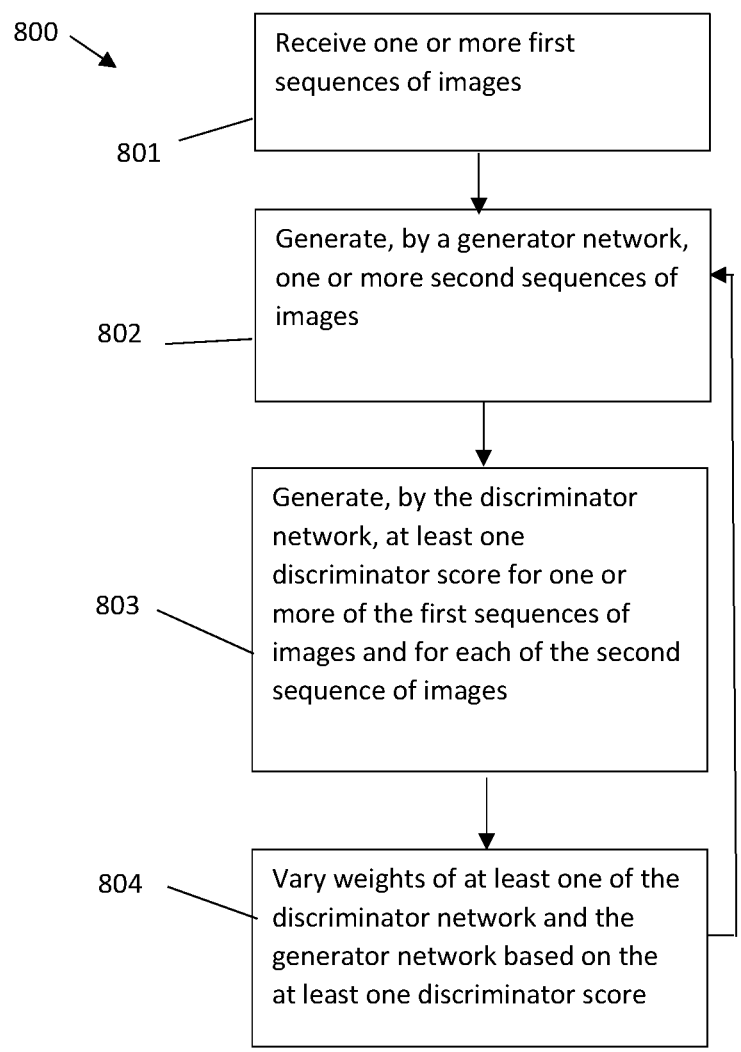
FIG. 8 shows the steps of jointly training a discriminator network and a generator network including a recurrent unit according to the present disclosure.

The convolutional gated recurrent unit receives this input vector at each of series of T time steps. In each time step, the output of the recurrent unit is a respective frames labelled t=1 to T. Optionally, as shown in FIG. 8 of Clark et al, the generative network may further include a conditioning stack which uses one or more conditioning frames (which may be captured images of the real work) to generate a conditioning vector for the recurrent unit which is input to the recurrent unit in time step t=1. The conditioning vector is received by the recurrent unit in the first time step in place of the output of the recurrent unit from a previous time step. The conditioning stack may generate the conditioning vector using the conditioning frames by applying a ResNet block, followed by a convolution with a k×k kernel and a ReLu activation layer.

Each of the T frames generated by the recurrent unit is processed separately by an output unit. The output unit processes each frame by a ResNet block, and the result is subject to a class-conditional batch norm. The result is processed by a ReLU activation layer, followed by a convolution with a 3×3 kernel to generate an output frame. The output of the generator network is the sequence of T output frames.

As noted, the discriminator of the generator-discriminator system may have the format shown in FIG. 3 of Clark et al. Alternatively, it may have the form shown in FIG. 7(*a*) or 7(*b*). An input to the discriminator is a video sequence which is either (i) a video sequence selected from the training data database and which is in one of the classes, or (ii) the conditioning frame(s) used by the conditioning stack, followed by the image sequence (output frames) output by the generator network. The task of the discriminator is to produce a signal L indicative of whether the input to the discriminator is of type (i) or type (ii). The latter possibility is illustrated in FIGS. 7(*a*) and 7(*b*), where the conditioning frames are denoted 71 and the image sequence output by the generator network is denoted 72.

Figure 7A:
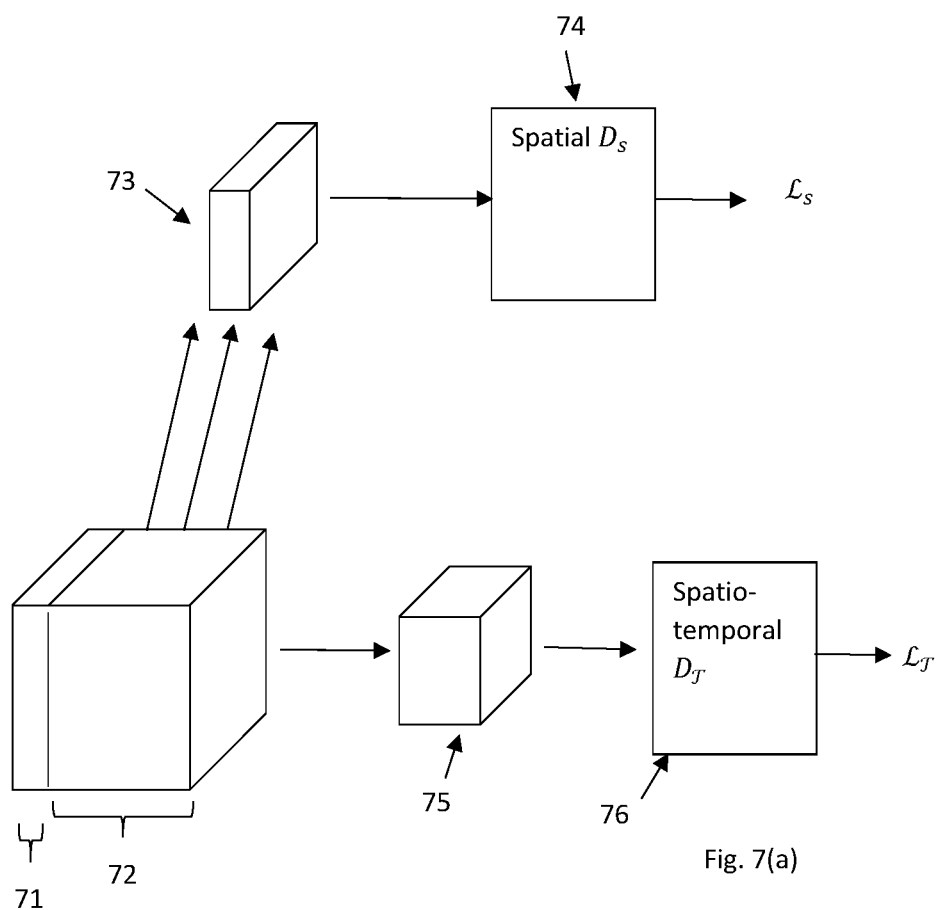
FIG. 7, which is composed of FIGS. 7(a) and 7(b), shows schematically two forms of discriminator unit which may be used for training a generator including a recurrent unit according to the disclosure.
Figure 7B:
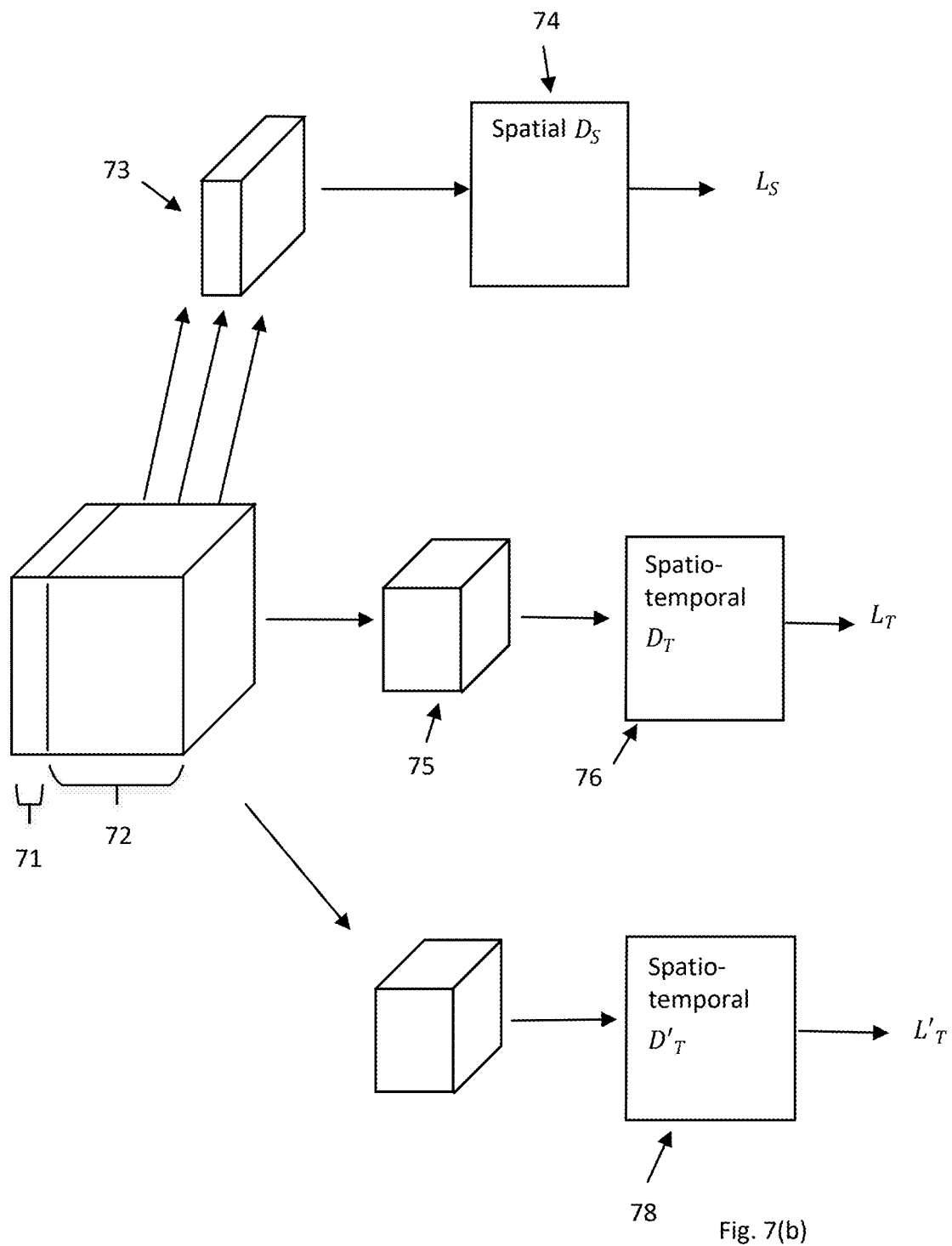

In the case of the discriminator of FIG. 7(*a*), the signal L is the sum of two components $\mathcal{L}_S$ and $\mathcal{L}\mathcal{L}$.

The component $\mathcal{L}_S$ is produced by selecting a proper subset of the frames from the input to the discriminator unit, and down-sampling them to form lower-resolution images 73. Thus, as compared to the image sequence 72, the set of images 73 is reduced in temporal resolution (because only a subset of the generated images are used) and spatial resolution (due to the down-sampling). The set of images 73 is analysed by a spatial discriminator network 74 which outputs the component $\mathcal{L}_S$. The spatial discriminator network 64 performs a function denoted $D_S$, and can take the same form as in Clark et al, that is a Resnet block followed by a ReLU activation layer. The spatial discriminator network 74 may also receive a one-hot vector which informs it which class the input video sequence is in.

The components $\mathcal{L}_T$ is produced by cropping each of the images 71, 72 input to the discriminator unit, to form smaller images 75. Thus, as compared to the image sequences 71, 72, the set of images 75 has the same temporal resolution but shows only a part of the original images. The set of images 75 is analysed by a spatio-temporal discriminator network 76 which outputs the component $\mathcal{L}_T$. The spatio-temporal discriminator network 76 performs a function denoted $DD_T$, and can take the same form as the temporal discriminator in FIG. 3 of Clark et al, that is a Resnet block followed by a ReLU activation layer. The spatio-temporal discriminator network 76 may also receive the one-hot vector which informs it which class the input video sequence is in.

The overall structure of the discriminator of FIG. 7(*a*) is the same as in FIG. 3 of Clark et al, with the difference that the images 73 are down-sampled and the images 75 are cropped. These processes do not happen in the discriminator network of Clark et al. The down-sampling to produce the images 73 reduces the number of operations required by the spatial discriminator.

The discriminator network of FIG. 7(*b*) is the same as that of FIG. 7(*a*) except that the output of the discriminator includes a further component $\mathcal{L}'_T$. This is generated by down-sampling the input videos 71, 72, and them processing them using a second spatio-temporal discriminator 78 which outputs the component $\mathcal{L}'_T$. The second spatio-temporal discriminator network 78 performs a function denoted $D'_T$, and can take the same form the temporal discriminator network in FIG. 3 of Clark et al, that is a Resnet block followed by a ReLU activation layer. The spatio-temporal discriminator network 64 may also receive the one-hot vector which informs it which class the input video sequence is. The discriminator network of FIG. 7(*b*) was found experimentally to provide substantial improvement to discrimination performance compared to known discriminator networks.

FIG. 8 illustrates a process for jointly training a generator network, such as one containing the proposed recurrent units 1, 4, 5, and a discriminator network, such as those shown in FIGS. 7(*a*) and 7(*b*). In a first step 801, a training database of first sequence of images is received. These may for example be images of the real world captured with a camera or other imaging sensor.

The generator network and discriminator network are updated (i.e. in parallel or interleaved manner) using an iterative procedure in which the set of steps 802-804 is performed repeatedly. In step 802, the generator network is used to generate one or more sequences of images (by the method illustrated in FIG. 9, described below). In step 803, the discriminator network is used to produce a discriminator score for each of the first sequences (or a sample of them) and the second sequences. In step 804, parameters (weights) of the discriminator network are varied to increase the expected difference in the next iteration between mean discriminator score for the first images and the mean discriminator score for the second images, and/or parameters of the generator network are modified to reduce the expected difference in the next iteration between mean discriminator score for the first images and the mean discriminator score for the second images. Optionally both the generator network and discriminator network are modified each time step 804 is performed (i.e. the respective updates to the generator network and discriminator network are in parallel, with both being updated in each iteration), or alternatively in each time step 804 a corresponding one of the generator network and discriminator networks are updated (i.e. the respective updates to the generator network and discriminator network are interleaved in successive iterations).

Figure 9:
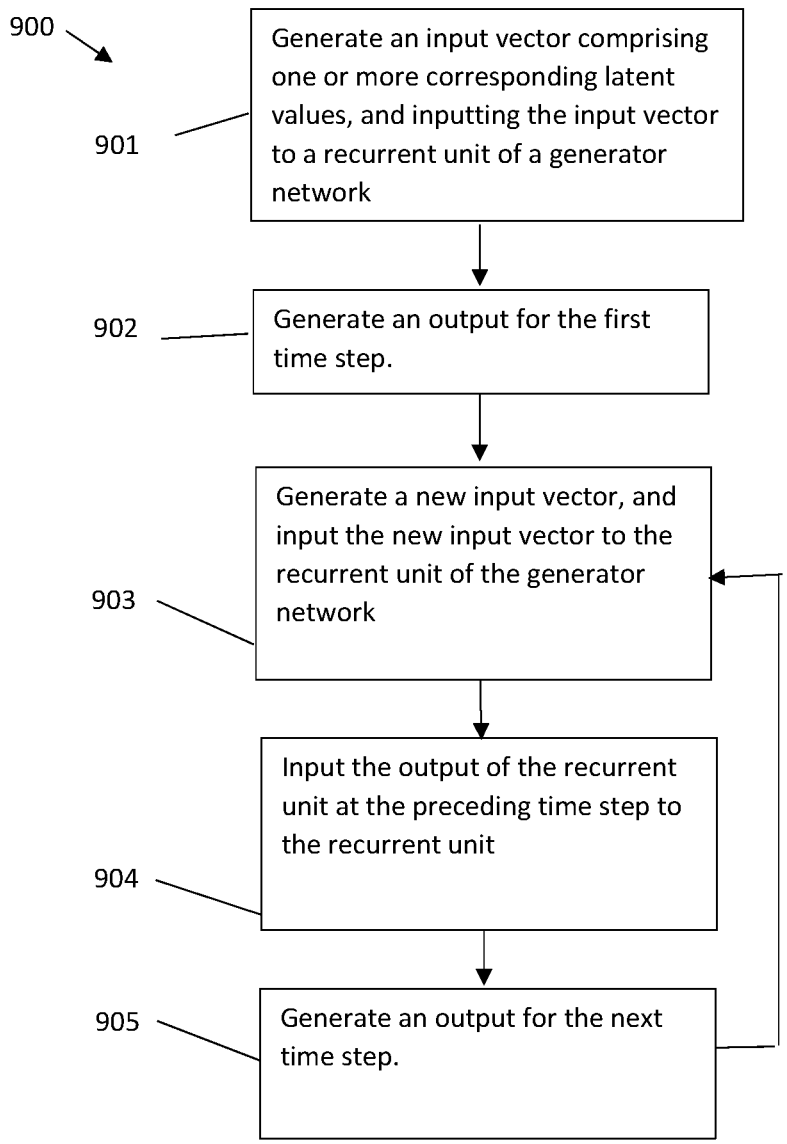
FIG. 9 shows a method generating a sequence of images by a generator including a recurrent unit according to the present disclosure.

FIG. 9 shows a method 900 used by the generator network including a recurrent unit which may be one of the recurrent units 1, 4, or 5 shown in FIG. 1, 4 or 5, to produce a sequence of images (e.g. a video sequence). This method is used in step 802 of method 800 illustrated in FIG. 8 during the training procedure, and it is also used following the training of the generator network.

In step 901, at a first time step, an input vector for the recurrent unit is generated comprising one or more latent values which may be selected from a distribution. The input vector is input to the recurrent unit of the generator network. Optionally, a conditioning vector is input to the recurrent unit also. The conditioning vector may be based on one or more images of the real world, e.g. captured by a camera. In step 902, the recurrent unit generates an output $h_1$.

At each of a series of further time steps denoted by t=2, . . . , T, the generator network performs the set of steps 903-905. In step 903, optionally, a newly-generated input vector may be input to the recurrent unit. Alternatively, the input vector generated in step 901 may be used a second time. In step 904, the output $h_{t-1}$ from the recurrent network at the previous time step is input to the recurrent network. In step 905, the recurrent network generates an output $h_t$. This may be the T-th frame of the image sequence. Alternatively, the output $h_t$ may be formatted by an output unit (e.g. of the type described above) to produce the T-th frame of the image sequence.

Figure 10:
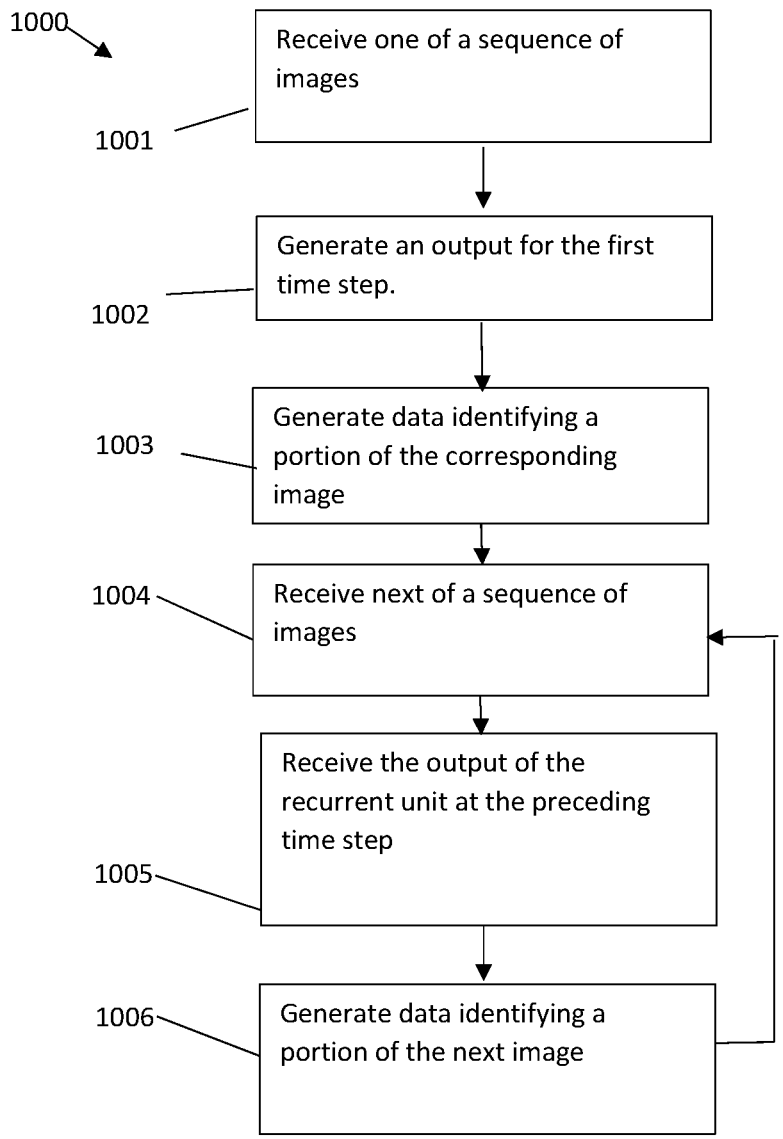
FIG. 10 shows a method of segmenting a sequence of images using a segmentation system including a recurrent unit according to the present disclosure.

Turning to FIG. 10 a further application of the recurrent unit 1, 4, 5 of FIG. 1, 4 or 5 is illustrated. FIG. 10 shows a method 1000 used by a segmentation network (segmentation system) including a recurrent unit which may be one of the recurrent units 1, 4, or 5 shown in FIG. 1, 4 or 5, to produce, using an input a sequence of images (e.g. a video sequence; the sequence of images may be images of the real world, e.g. captured with a camera), data identifying a respective portion of interest in each of the sequence of images. In step 1001, at a first time step, an input vector for the recurrent unit is generated based on a first of the sequence of images, and this is input to the recurrent unit. In step 1002, the recurrent unit generates an output $h_1$. In step 1003, the recurrent unit generates an output which includes data (or from which data may be obtained using an output unit of the segmentation network) indicating a portion of interest in the first image.

At each of a series of further time steps denoted by t=2, . . . , T, the segmentation network performs the set of steps 1004-1006. In step 1004, a new input vector is input to the recurrent unit based on the next image of the sequence of images (i.e. the t-th image of the sequence). In step 1005, the output $h_{t-1}$ from the recurrent network at the previous time step is input to the recurrent network. In step 1006, the recurrent network generates an output $h_t$. This may be the data identifying a portion of interest in the T-th frame of the image sequence. Alternatively, the output $h_t$ may be formatted by an output unit of the segmentation network to produce data identifying the portion of interest in the T-th frame of the image sequence.

Figure 11:
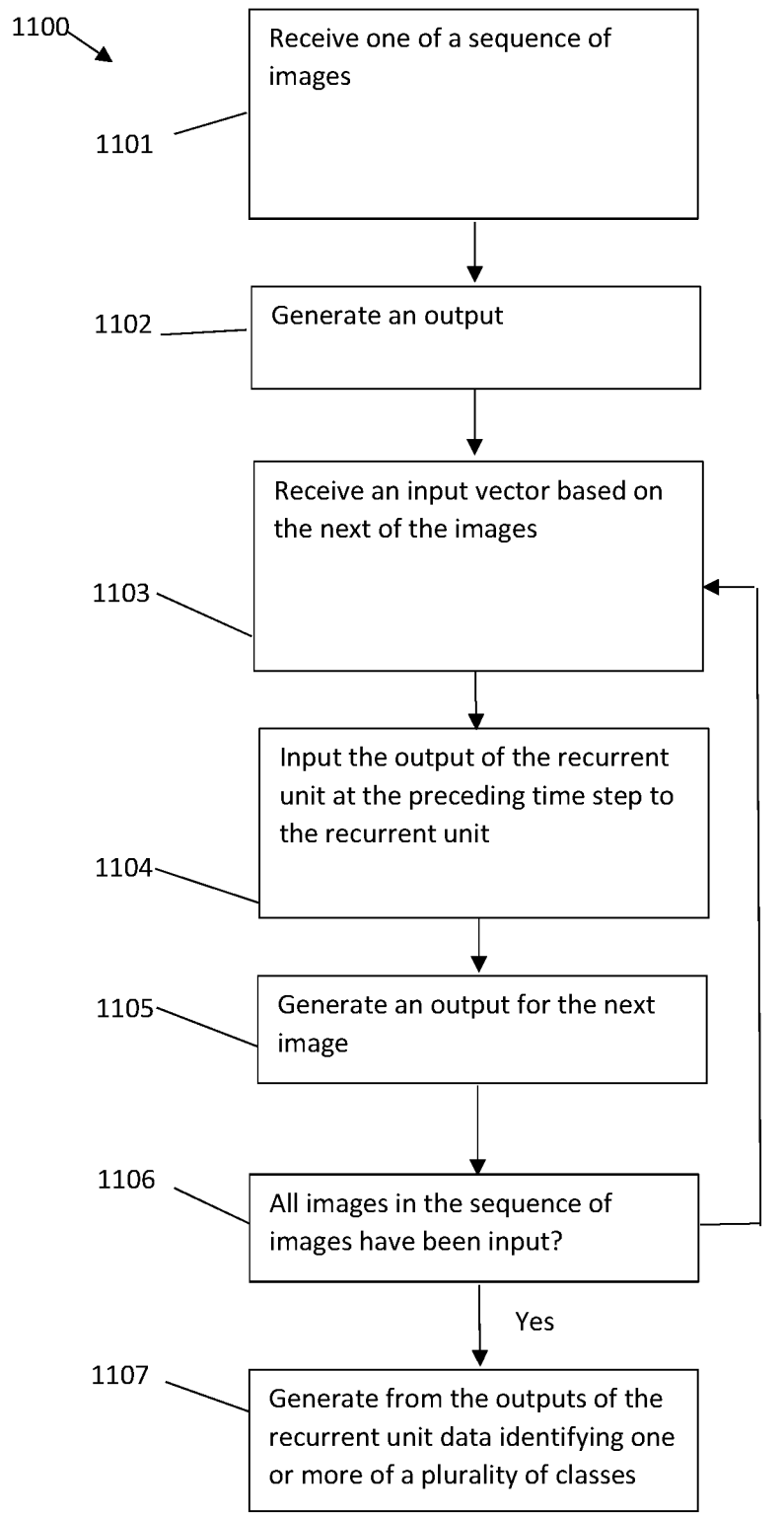
FIG. 11 shows a method of classifying a sequence of images using a classifier system including a recurrent unit according to the present disclosure.

Turning to FIG. 11 a further application of the recurrent unit 1, 4, 7 of FIG. 1, 4 or 5 is illustrated. FIG. 11 shows a method 1100 used by a classification network (classification system) including a recurrent unit which may be one of the recurrent units 1, 4, or 5 shown in FIG. 1, 4 or 5, to produce, using an input sequence of images (e.g. a video sequence; the sequence of images may be images of the real world, e.g. captured with a camera), a classification of the input sequence of images (a single classification for the whole sequence, or a classification of each of the images). In step 1101, at a first time step, an input vector for the recurrent unit is generated based on a first of the sequence of images. In step 1102, the recurrent unit generates an output $h_1$.

At each of a series of further time steps denoted by t=2, . . . , T, the classification network performs the set of steps 1103-1106. In step 1103, a new input vector is input to the recurrent unit based on the next image of the sequence of images (i.e. the t-th image of the sequence). In step 1104, the output $h_{t-1}$ from the recurrent network at the previous time step is input to the recurrent network. In step 1105, the recurrent network generates an output $h_t$. In step 1106 it is determined whether all images in the image sequence have been processes. If not, the method returns to step 1103.

Alternatively, if the determination in step 1106 is positive, in step 1107 one or more of the T outputs of the recurrent unit are used, e.g. by an output unit of the classification system, to generate data which identifies one or more of the plurality of classes. Thus, the input image sequence of images has been classified as belonging to the one or more classes. In a variation, in step 1107, the output of the recurrent unit for each time step is used to generate data which identifies the corresponding image of the input sequence of images as belonging to one or more of the plurality of classes.

Figure 12:
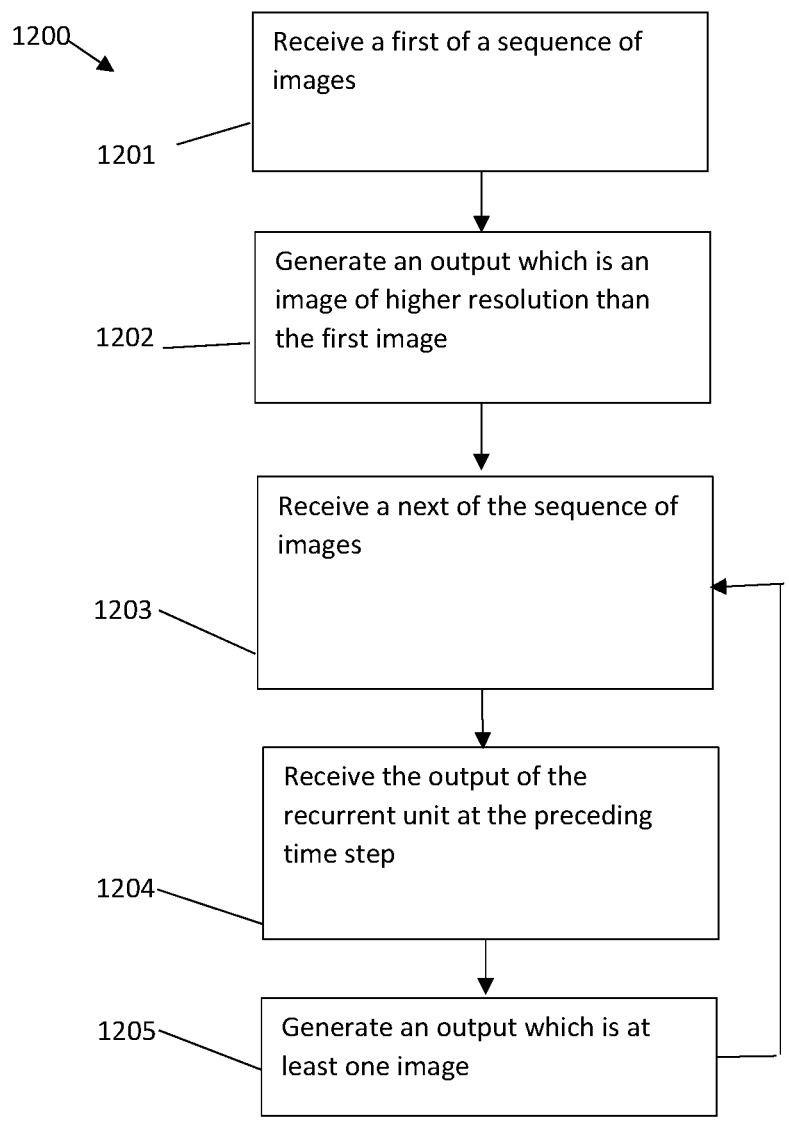
FIG. 12 shows a method of increasing the spatial and/or temporal resolution of a sequence of images using an adaptive system including a recurrent unit according to the present disclosure.

Turning to FIG. 12, a further application of the recurrent unit 1, 4, 7 of FIG. 1, 4 or 5 is illustrated. FIG. 12 shows a method 1200 used by an adaptive system for increasing the spatial and/or temporal resolution of an input sequence of images, which may be images of the real-world, e.g. captured by a camera. The adaptive system includes a recurrent unit which may be one of the recurrent units 1, 4, or 5 shown in FIG. 1, 4 or 5. In step 1201, at a first time step, an input vector for the recurrent unit is generated based on a first of the sequence of images. In step 1202, the recurrent unit generates an output $h_1$.

At each of a series of further time steps denoted by t=2, . . . ,T, the adaptive system performs the set of steps 1203-1205. In step 1203, a new input vector is input to the recurrent unit based on the next image of the sequence of images (i.e. the t-th image of the sequence). In step 1204, the output $h_{t-1}$ from the recurrent network at the previous time step is input to the recurrent network. In step 1205, the recurrent network generates an output $h_t$.

The output $h_t$ for each of the T steps (or a version of it obtained by a post-processing it using an output unit of the adaptive system) may be a single image which is of higher spatial resolution than the image input in the corresponding step 1203. Alternatively, it may be multiple images (e.g. of the same spatial resolution as the input image input in step 1203, or of higher spatial resolution); thus, the input sequence of images can be used to produce a higher number of images from the outputs of the recurrent unit, such as an image sequence with higher temporal resolution. For example, if successive ones of the input sequence of images represent a scene at respective moments separated by a period P, the output generated in step 1205 following the input of one of the sequence of images at step 1203 may be: (i) a first image which is represents the scene at the same moment as the corresponding input image, and (ii) a second image which represents the scene P/2 later. Thus, the temporal resolution of the input sequence of images is doubled by the adaptive system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising one or more computers and one or more storage devices storing instructions that when executed by the one or more computers cause the one or more computers to implement:
a recurrent unit arranged, at each of a series of time steps, to receive a corresponding input vector and to generate an output having at least one respective value for each of a two-dimensional array of pixels,
the recurrent unit being configured at each of the series of time steps except a first time step: to receive the output of the recurrent unit at a preceding time step,
to apply to the output of the recurrent unit at the preceding time step at least one convolution dependent on both the input vector at the time step and the output of the recurrent unit at the preceding time step, to generate a warped dataset which has at least one component for each pixel of the array, wherein the at least one component of the warped dataset for each pixel of the array is generated by convolving the output of the recurrent unit at the preceding time step with a respective kernel that is determined based on an output of a neural network that receives the input vector and the output of the recurrent unit at the preceding time step, and
to generate the output at the time step based on the warped dataset and the input vector.

2. The system according to claim 1 wherein the recurrent unit neural network is configured to generate the respective kernel for each pixel of the array using the input vector and the output of the recurrent unit at the preceding time step.

3. The system according to claim 1 wherein the recurrent unit is configured to:
generate the at least one component of the warped dataset as a weighted sum of convolutions of the corresponding component of the output of the recurrent unit at the preceding time step with a respective plurality of kernels which are generated by the neural network that receives the input vector and the output of the recurrent unit at the preceding time step, the weights of the weighted sum being different for different said pixels of the array.

4. The system according to claim 1 wherein the recurrent unit which is configured to generate the output at each time step as a sum of (i) a component-wise product of the warped dataset with a fusion vector, and (ii) a component-wise product of a vector varying inversely with the fusion vector and a refined vector generated by a rectified linear unit of the recurrent unit.

5. The system according to claim 4 wherein the recurrent unit is configured to generate each element of the fusion vector by applying a function to: a respective component of a component-wise product of a first weight vector with a concatenation of the output of a network at the preceding time step and the input vector plus a respective first offset value.

6. The system according to claim 4 wherein the recurrent unit is configured to generate each element of the fusion vector by applying a function to: a respective component of a component-wise product of a first weight vector with a concatenation of the warped dataset and the input vector plus a respective first offset value.

7. The system according to claim 4 in which the rectified linear unit is configured to generate each element of the refined vector by applying a rectified linear function to: a respective component of a component-wise product of a second weight vector with a concatenation of the output of a network at the preceding time step and the input vector plus a respective second offset value.

8. The system according to claim 4 in which the rectified linear unit is configured to generate each element of the refined vector by applying a rectified linear function to: respective components of a component-wise product of a second weight vector with a concatenation of the output of the warped dataset and the input vector plus a respective second offset value.

9. The system according to claim 1, wherein the instructions further cause the one or more computers to implement a generator network to generate a sequence of images representing a temporal progression and composed of values for each of a two-dimensional array of pixels, the generator network being configured to generate each of the sequence of images based on the respective output of the recurrent unit in a respective one of the time steps.

10. The system according to claim 9, wherein the instructions, when executed by the one or more computers, further cause the one or more computers to perform operations for jointly training the generator network and a discriminator network, the discriminator network being for distinguishing between sequences of images generated by the generator network and sequences of images which are not generated by the generator network, the operations comprising:
receiving one or more first sequences of images representing a temporal progression; and repeatedly performing iteration steps of:
generating, by the generator network, one or more second sequences of images;
generating, by the discriminator network, at least one discriminator score for one or more of the first sequences of images and for each of the second sequence of images; and
varying weights of at least one of the discriminator network and the generator network based on the at least one discriminator score.

11. The system according to claim 10, in which the discriminator network comprises a spatio-temporal discriminator network for discriminating based on temporal features and a spatial discriminator network for discriminating based on spatial features, the spatio-temporal discriminator network and the spatial discriminator network each comprising a multi-layer network of neurons in which each layer performs a function defined by corresponding weights;
said generation of the at least one discriminator score comprising:
(i) forming, from an input sequence, a first set of one or more images having a lower temporal resolution than the input sequence, and inputting the first set into the spatial discriminator network to determine, based on the spatial features of each image in the first set, a first discriminator score representing a probability that the input sequence has been generated by the generator network; and
(ii) forming, from the input sequence, a second set of images having a lower spatial resolution than the input sequence, and inputting the second set into the spatio-temporal discriminator network to determine, based on the temporal features of the images in the second set, a second discriminator score representing a probability that the input sequence has been generated by the generator network; and
said varying the weights of at least one of the discriminator network and the generator network comprising updating the weights based on the first discriminator score and the second discriminator score.

12. The system according to claim 1, wherein the instructions further cause the one or more computers to implement a segmentation network to identify within a sequence of images a portion of each image having one or more characteristics, the recurrent unit being arranged at each of series of time steps to receive an input vector comprising a corresponding one of the sequence of images, the segmentation network being configured to generate in each time step data from the output of the recurrent unit in the corresponding time step, wherein the data from the output of the recurrent unit identifies a portion of the corresponding image.

13. The system according to claim 1, wherein the instructions further cause the one or more computers to implement a classification network to generate data which classifies a sequence of images as being in one or more of a set of classes, the recurrent unit being arranged at each of series of time steps to receive an input vector comprising a corresponding one of the sequence of images, the classification network being configured to generate from the outputs of the recurrent unit at each of the respective series of time steps data identifying one or more of the classes.

14. The system according to claim 1, wherein the instructions further cause the one or more computers to implement an adaptive system for increasing the spatial and/or temporal resolution of a sequence of images, the adaptive system comprising the recurrent unit the recurrent unit being arranged at each of a series of time steps to receive an input vector comprising a one of a first sequence of images, the adaptive system being configured to generate a sequence of images having higher spatial and/or temporal resolution than images of the first sequence of images.

15. One or more non-transitory computer-readable storage media storing instructions that when executed by one or more computers cause the one or more computers to implement:
 a recurrent unit arranged, at each of a series of time steps, to receive a corresponding input vector and to generate an output having at least one respective value for each of a two-dimensional array of pixels,
 the recurrent unit being configured at each of the series of time steps except a first time step: to receive the output of the recurrent unit at a preceding time step,
 to apply to the output of the recurrent unit at the preceding time step at least one convolution dependent on both the input vector at the time step and the output of the recurrent unit at the preceding time step, to generate a warped dataset which has at least one component for each pixel of the array, wherein the at least one component of the warped dataset for each pixel of the array is generated by convolving the output of the recurrent unit at the preceding time step with a respective kernel that is determined based on an output of a neural network that receives the input vector and the output of the recurrent unit at the preceding time step, and
 to generate the output at the time step based on the warped dataset and the input vector.

16. One or more non-transitory computer-readable storage media according to claim 15 wherein the neural network is configured to generate the respective kernel for each pixel of the array using the input vector and the output of the recurrent unit at the preceding time step.

17. One or more non-transitory computer-readable storage media according to claim 15 wherein the recurrent unit is configured to:
 generate the at least one component of the warped dataset as a weighted sum of convolutions of the corresponding component of the output of the recurrent unit at the preceding time step with a respective plurality of kernels which are generated by the neural network that receives the input vector and the output of the recurrent unit at the preceding time step, the weights of the weighted sum being different for different said pixels of the array.

18. One or more non-transitory computer-readable storage media according to claim 15 wherein the recurrent unit is configured to generate the output at each time step as a sum of (i) a component-wise product of the warped dataset with a fusion vector, and (ii) a component-wise product of a vector varying inversely with the fusion vector and a refined vector generated by a rectified linear unit of the recurrent unit.

19. A computer-implemented method, comprising:
 receiving, by a recurrent unit, at each of a series of time steps, a corresponding input vector to generate an output having at least one respective value for each of a two-dimensional array of pixels, wherein, at each of the series of time steps except a first time step, the recurrent unit performs operations comprising:
 receiving the output of the recurrent unit at a preceding time step;
 applying, to the output of the recurrent unit at the preceding time step, at least one convolution dependent on both the input vector at the time step and the output of the recurrent unit at the preceding time step, to generate a warped dataset which has at least one component for each pixel of the array, wherein the at least one component of the warped dataset for each pixel of the array is generated by convolving the output of the recurrent unit at the preceding time step with a respective kernel that is determined based on an output of a neural network that receives the input vector and the output of the recurrent unit at the preceding time step, and
 generating the output at the time step based on the warped dataset and the input vector.

* * * * *